US012198217B2

(12) United States Patent
Mori et al.

(10) Patent No.: US 12,198,217 B2
(45) Date of Patent: Jan. 14, 2025

(54) INFORMATION PROCESSING APPARATUS, INFORMATION PROCESSING METHOD, AND STORAGE MEDIUM

(71) Applicant: NEC Corporation, Tokyo (JP)

(72) Inventors: Yusuke Mori, Tokyo (JP); Akira Kamei, Tokyo (JP); Miki Otani, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 18/013,032

(22) PCT Filed: Jul. 2, 2020

(86) PCT No.: PCT/JP2020/026098
§ 371 (c)(1),
(2) Date: Dec. 27, 2022

(87) PCT Pub. No.: WO2022/003923
PCT Pub. Date: Jan. 6, 2022

(65) Prior Publication Data
US 2023/0274381 A1 Aug. 31, 2023

(51) Int. Cl.
G06Q 50/40 (2024.01)
G06Q 10/1093 (2023.01)
(52) U.S. Cl.
CPC ......... *G06Q 50/40* (2024.01); *G06Q 10/1093* (2013.01)
(58) Field of Classification Search
CPC ........ G06Q 50/30; G06Q 50/40; G06Q 50/26; G06Q 10/083; G06Q 50/43; G06Q 50/47;
(Continued)

(56) References Cited

U.S. PATENT DOCUMENTS 5,541,585 A * 7/1996 Duhame .................. G07C 9/28
235/382
2008/0243330 A1 10/2008 Kato
(Continued)

FOREIGN PATENT DOCUMENTS

CN 106774333 A 5/2017
EP 3 223 231 A1 * 9/2017 ............. G06Q 50/30
(Continued)

OTHER PUBLICATIONS

Fair Disclosure Wire, "Interim 2017 Sydney Airport Holdings Pty Ltd Earnings Call—Final," Linthicum, Aug. 22, 2017.*
(Continued)

*Primary Examiner* — Nathan Erb
(74) *Attorney, Agent, or Firm* — Sughrue Mion, PLLC

(57) ABSTRACT

Provided are an information processing apparatus, an information processing method, and a storage medium that can accurately guide facilities or services which are available to a user who is scheduled to take a transportation. An information processing apparatus includes: a registration unit that registers a status of a user scheduled to board on a transportation related to boarding acquired by a boarding procedure and biometric information of the user acquired during the boarding procedure in association with each other; and a generation unit that generates guide information related to a facility or a service available to the user guided by an information processing terminal according to the status of the user, who is identified by matching of target biometric information which is biometric information acquired by the information processing terminal for one user, and registered biometric information which is the biometric information registered by the registration unit.

15 Claims, 26 Drawing Sheets

(58) Field of Classification Search
CPC .... G06Q 50/50; G06Q 10/1093; H04L 12/14; H04M 3/00; H04M 15/00; H04M 17/00; H04W 4/24
See application file for complete search history.

(56) References Cited

U.S. PATENT DOCUMENTS

| | | | | |
|---|---|---|---|---|
| 2011/0133892 | A1* | 6/2011 | Nohr | G07C 9/28 340/10.1 |
| 2015/0025920 | A1* | 1/2015 | Stelling | G06Q 10/02 705/5 |
| 2016/0104233 | A1* | 4/2016 | Parrish | G06Q 30/0639 705/26.9 |
| 2017/0070501 | A1 | 3/2017 | Saito et al. | |
| 2018/0204237 | A1* | 7/2018 | Jafri | G06Q 30/0233 |
| 2020/0043118 | A1 | 2/2020 | Sakaguchi et al. | |

FOREIGN PATENT DOCUMENTS

| | | |
|---|---|---|
| JP | 2008-249633 A | 10/2008 |
| JP | 2016-099920 A | 5/2016 |
| JP | 2017-016614 A | 1/2017 |
| JP | 2017-224050 A | 12/2017 |
| JP | 2018-017924 A | 2/2018 |
| JP | 2019-125309 A | 7/2019 |
| WO | 2015/136938 A1 | 9/2015 |
| WO | 2020/026367 A1 | 2/2020 |

OTHER PUBLICATIONS

International Search Report for PCT Application No. PCT/JP2020/026098, mailed on Sep. 24, 2020.

Japanese Office Communication JP Application No. 2022-532971, mailed on Mar. 19, 2024 with English Translation.

* cited by examiner

FIG. 8

| USER ID | IDENTITY INFORMATION | | | | SCHEDULED FLIGHT INFORMATION | | | | | | STATUS INFORMATION |
|---|---|---|---|---|---|---|---|---|---|---|---|
| | NAME | PASSPORT NUMBER | MEMBERSHIP NUMBER | FACE INFORMATION | FLIGHT NUMBER | DEPARTURE PLACE | ARRIVAL PLACE | DEPARTURE TIME | BOARDING GATE | SEAT CLASS | |
| 10101 | XX XX | MAXXXXXXX | M2023 | 😊 | AB101 | NRT | LHR | 10:00 | 50 | F | A |
| 10102 | XX XX | MCXXXXXXX | M7011 | 😊 | AB105 | NRT | CDG | 10:30 | 60 | Y | - |
| 10103 | XX XX | MDXXXXXXX | M5102 | 😊 | AB109 | NRT | FCO | 10:50 | 40 | C | B |
| ... | | | | | | | | | | | |

| FLIGHT ID | FLIGHT NUMBER | DEPARTURE PLACE | ARRIVAL PLACE | DEPARTURE TIME | ARRIVAL TIME | BOARDING GATE | BOARDING START TIME | FLIGHT STATUS |
|---|---|---|---|---|---|---|---|---|
| 40101 | AB101 | NRT | LHR | 10:00 | 13:35 | 50 | 9:30 | ON TIME |
| 40102 | AB102 | NRT | CDG | 10:10 | 15:45 | 60 | 9:40 | DELAYED |
| 40103 | AB103 | NRT | MXP | 10:20 | 16:00 | 40 | — | CANCELED |
| | | | | .... | | | | |

| MEMBERSHIP NUMBER | NAME | STATUS | NUMBER OF POINTS |
|---|---|---|---|
| M1001 | XX XX | B | 90,125 |
| M1002 | XX XX | C | 20,532 |
| M1003 | XX XX | A | 201,258 |
| ⋮ | | | |

FIG. 11
| INDIVIDUAL ID | NAME | PASSPORT NUMBER | FACE INFORMATION | TRAVEL HISTORY |
|---|---|---|---|---|
| 20101 | XX XX | MAXXXXXXX |  | ... |
| 20102 | XX XX | MTXXXXXXX |  | ... |
| 20103 | XX XX | MDXXXXXXX |  | ... |
| ⋮ | | | | |
106d

GUIDE ON ALTERNATE FLIGHT

| DEPARTURE PLACE | ARRIVAL PLACE |
|---|---|
| NRT | LHR |

G74:
- PREFERABLE CONDITIONS
  - ☐ REQUEST FOR EARLIEST POSSIBLE ARRIVAL — G7402
  - ☐ REQUEST EXCLUDING NIGHTTIME ARRIVALS — G7404
  - ☐ SPECIFY TIME ZONE (DEPARTURE TIME) [ : ] ~ [ : ] — G7406
  - ☐ SPECIFY TIME ZONE (ARRIVAL TIME) [ : ] ~ [ : ] — G7408

G72:

| FLIGHT NUMBER | DEPARTURE DATE | DEPARTURE TIME | ARRIVAL TIME |
|---|---|---|---|
| AB107 | TODAY | 15:15 | 18:50 |
| AB101 | TOMORROW | 10:00 | 13:35 |

G76:

GUIDE ON ACCOMMODATION
PASSENGER RESCHEDULING TO LATER FLIGHT CAN STAY AT THE FOLLOWING ACCOMMODATIONS

| ACCOMMODATION NAME | CONTACT |
|---|---|
| ○○○ HOTEL | XXX - XXX - XXXX |
| HOTEL ☐☐☐ | XXX - XXX - XXXX |

( CONTINUE TO USE CHECK-IN PROCEDURE WITH BIOMETRIC INFORMATION ) — G78

INFORMATION PROCESSING APPARATUS, INFORMATION PROCESSING METHOD, AND STORAGE MEDIUM

This application is a National Stage Entry of PCT/JP2020/026098 filed on Jul. 2, 2020, the contents of all of which are incorporated herein by reference, in their entirety.

TECHNICAL FIELD

The present invention relates to an information processing apparatus, an information processing method and a storage medium.

BACKGROUND ART

PTL 1 discloses an information display system that generates an individual guide screen based on information related to the most recent activity schedule and personal preferences of a user, such as flight information booked by the user.

CITATION LIST

Patent Literature

PTL 1: Japanese Patent Application Laid-Open No. 2018-17924

SUMMARY OF INVENTION

Technical Problem

However, since the system disclosed in PTL 1 generates a guide based on the most recent activity schedule and the like of the user, it is difficult to accurately guide facilities or services which are available to the user.

In view of the above problem, it is an example object of the present invention to provide an information processing apparatus, an information processing method, and a storage medium that can accurately guide facilities or services which are available to a user who is scheduled to take a transportation.

Solution to Problem

According to one example aspect of the present invention, there is provided an information processing apparatus including: a registration unit that registers a status of a user scheduled to board on a transportation related to boarding acquired by a boarding procedure and biometric information of the user acquired during the boarding procedure in association with each other; and a generation unit that generates guide information related to a facility or a service available to the user guided by an information processing terminal according to the status of the user, who is identified by matching of target biometric information which is biometric information acquired by the information processing terminal for one user, and registered biometric information which is the biometric information registered by the registration unit.

According to another example aspect of the present invention, there is provided an information processing method including: registering a status of a user scheduled to board on a transportation related to boarding acquired by a boarding procedure and biometric information of the user acquired during the boarding procedure in association with each other; and generating guide information related to a facility or a service available to the user guided by an information processing terminal according to the status of the user, who is identified by matching of target biometric information which is biometric information acquired by the information processing terminal for one user, and registered biometric information which is the biometric information registered by the registration unit.

According to another example aspect of the present invention, there is provided a storage medium storing a program that causes a computer to perform: registering a status of a user scheduled to board on a transportation related to boarding acquired by a boarding procedure and biometric information of the user acquired during the boarding procedure in association with each other; and generating guide information related to a facility or a service available to the user guided by an information processing terminal according to the status of the user, who is identified by matching of target biometric information which is biometric information acquired by the information processing terminal for one user, and registered biometric information which is the biometric information registered by the registration unit.

Advantageous Effects of Invention

According to the present invention, it is possible to accurately guide facilities or services which are available to a user who is scheduled to take a transportation.

BRIEF DESCRIPTION OF DRAWINGS

FIG. 8 is a schematic diagram illustrating an example of a user database of the management server according to the first example embodiment of the present invention.

FIG. 9 is a schematic diagram illustrating an example of a flight database of the management server according to the first example embodiment of the present invention.

FIG. 10 is a schematic diagram illustrating an example of a member database of the management server according to the first example embodiment of the present invention.

FIG. 11 is a schematic diagram illustrating an example of a travel history database of the management server according to the first example embodiment of the present invention.

FIG. 25 is a schematic diagram illustrating an example of a guide screen displayed in the signage terminal according to the second example embodiment of the present invention.

DESCRIPTION OF EMBODIMENTS

First Example Embodiment

An information processing system, information processing apparatuses, and an information processing method according to a first example embodiment of the present invention will be described with reference to FIG. 1 to FIG. 18.

Figure 1:
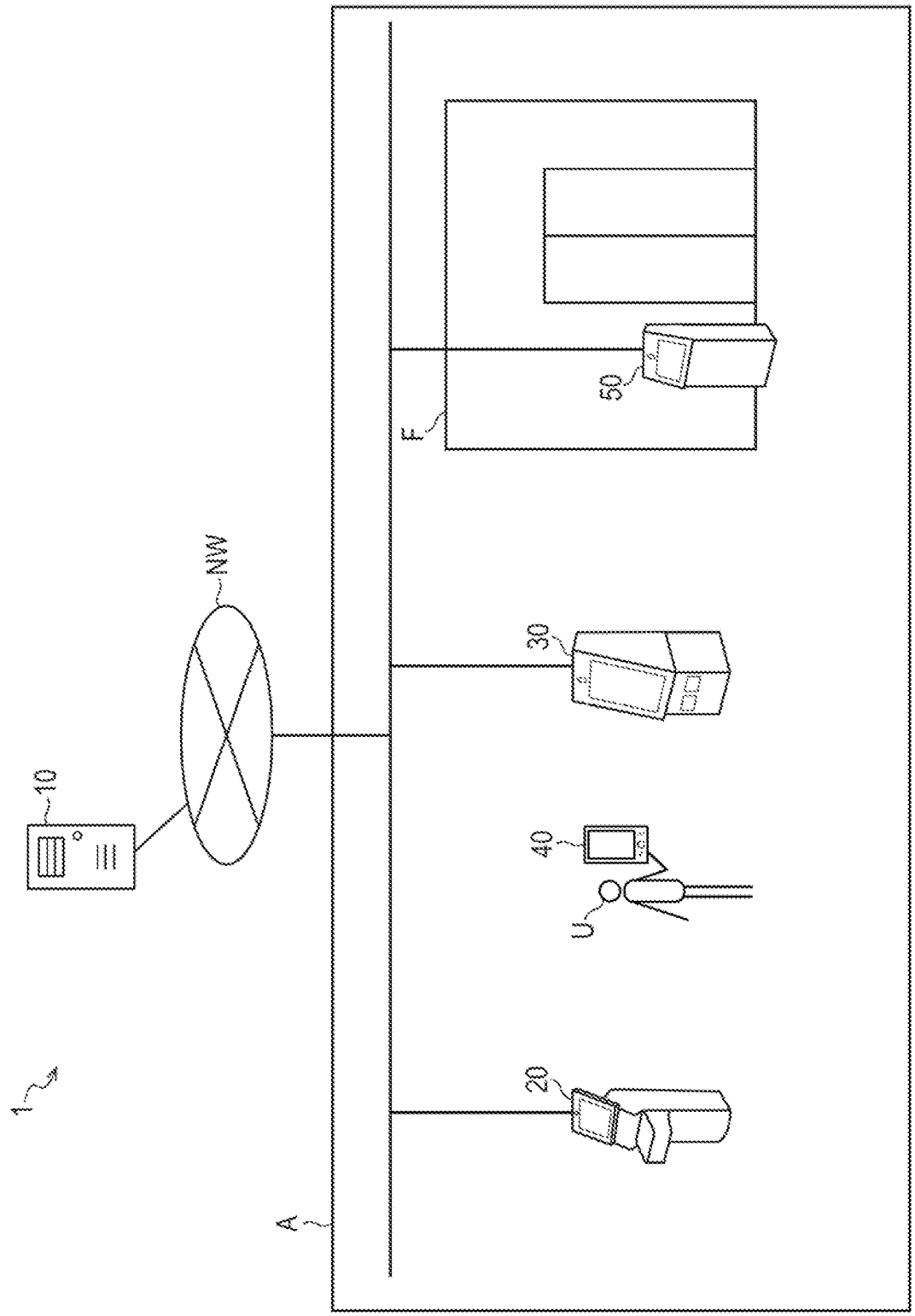
FIG. 1 is a schematic diagram illustrating the overall configuration of an information processing system according to a first example embodiment of the present invention.

First, the configuration of the information processing system according to the present example embodiment is described with reference to FIG. 1. FIG. 1 is a schematic diagram illustrating the overall configuration of the information processing system according to the present example embodiment.

As illustrated in FIG. 1, the information processing system 1 according to the present example embodiment includes a management server 10, a check-in terminal 20, a signage terminal 30, a mobile terminal 40, and a facility terminal 50. The information processing system 1 according to the present example embodiment is, for example, a guide management system that manages information to be guided in the signage terminal 30, which is a guide terminal, to a user U who is a passenger who is scheduled to board an aircraft, which is a transportation, at an airport A, which is a transportation facility. In the present example embodiment, a case where a guide is performed about facilities or services available to a user U at the airport A is described. Note that, in a second example embodiment, a case where a guide is performed about the flight of an aircraft that a user U is scheduled to board at the airport A will be described.

Note that the information processing system 1 does not need to perform the both guides as described in the present example embodiment and the second example embodiment, but only needs to perform at least one of both guides.

In addition, the information processing system 1 may be a system that manage information to be guided by the signage terminal 30 to a user U who is scheduled to board an aircraft at the airport A as well as to a user who is scheduled to take a transportation at a transportation facility for taking a transportation as transportation means. For example, the information processing system 1 may manage information to be guided to a user who is scheduled to board a vessel that is a transportation at a seaport. For example, the information processing system 1 may manage information to be guided to a user who is scheduled to board a train that is a transportation at a station.

The management server 10 is installed in a facility of, for example, an airline company or the like. The check-in terminal 20 is installed, for example, in the check-in lobby in the airport A. The signage terminals 30 are installed at various locations within the airport A, such as check-in lobbies, baggage counters, security inspection areas, departure examination areas, boarding gates, lounges, waiting rooms, waiting areas, passageways, and the like, regardless of the area before or after departure procedures. The mobile terminal 40 is carried by the user U. The facility terminal 50 is installed in a facility F such as a lounge which is available to the user U.

After arriving at the airport A, the user U, who is scheduled to board an international aircraft, performs check-in procedure at the check-in terminal 20. The check-in procedure is the boarding procedure for the user U to board the aircraft. After the check-in procedure, the user U can receive various information at signage terminals 30 installed at various locations in the airport A. Specifically, at the signage terminals 30, the user U can receive information related to the facilities, services, and the like which the user U can use at the airport A and information related to the actions which the user U should take in connection with the flight of the aircraft on which the user U is scheduled to board at the airport A.

Note that, in the present example embodiment, a case where the user U is a person who is scheduled to board an international aircraft, but the user U may also be a person who is scheduled to board on a domestic aircraft. In the case of the user U who is scheduled to board on a domestic aircraft, the procedure or processing related to boarding on an international aircraft will be omitted.

The management server 10, the check-in terminal 20, the signage terminal 30 and the facility terminal 50 are connected to a network NW. The network NW consists of a local area network (LAN), a wide area network (WAN), a mobile communication network, and the like, including the private communication network of the airport A. The mobile terminal 40 can be connected to the network NW by wireless method.

Next, respective components of the information processing system 1 according to the present example embodiment will be described further with reference to FIG. 2 to FIG. 6.

Figure 2:
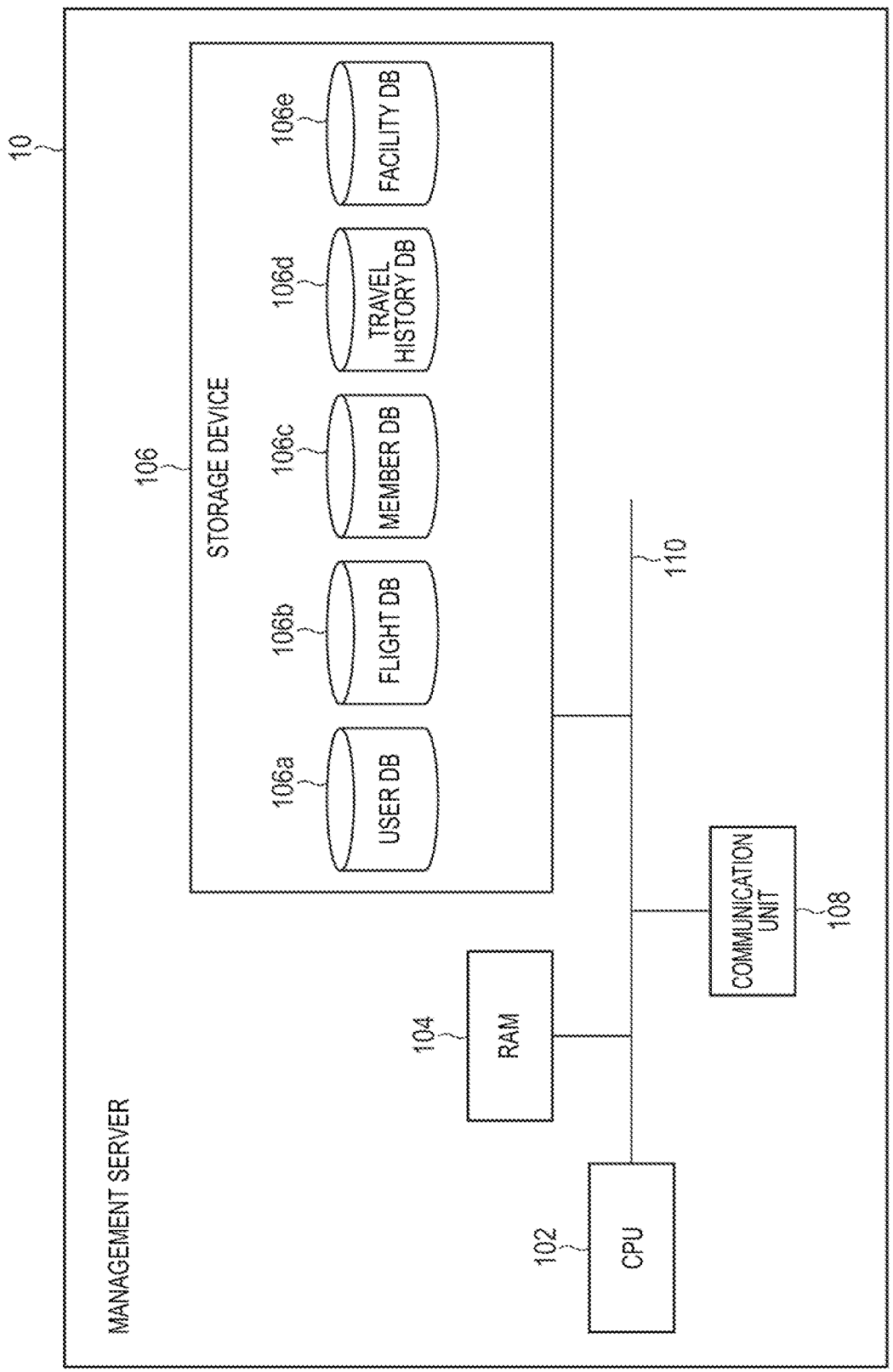
FIG. 2 is a block diagram illustrating an example of the hardware configuration of a management server according to the first example embodiment of the present invention.

First, the configuration of the management server 10 will be described with reference to FIG. 2. FIG. 2 is a block diagram illustrating an example of the hardware configuration of the management server 10. The management server 10 is an information processing apparatus that manages information to be displayed on the signage terminal 30. Note that the functions of the management server 10 may be realized by a single server or by multiple servers.

As illustrated in FIG. 2, the management server 10 has a CPU (Central Processing Unit) 102, a RAM (Random Access Memory) 104, a storage device 106, and a communication unit 108. The CPU 102, the RAM 104, the storage device 106 and the communication unit 108 are connected to a bus line 110.

The CPU 102 operates by executing a program stored in the storage device 106 and functions as a control unit to control the overall operation of the management server 10. Further, the CPU 102 executes application programs stored in the storage device 106 to execute various processes as the management server 10. The RAM 104 provides a memory area required for the operation of the CPU 102.

The storage device 106 is formed of a storage medium such as a nonvolatile memory, a hard disk drive, or the like and functions as a storage unit. The storage device 106 stores programs executed by the CPU 102, data, a database (DB), and the like referenced by the CPU 102 in execution of the program, and the like.

The storage device 106 stores a user DB 106a, a flight DB 106b, a member DB 106c, a travel history DB 106d and a facility DB 106e. The details of each DB are described later. Note that the management server 10 does not necessarily need to be a server with these DBs stored in the storage device 106. The management server 10 may be configured to be able to reference all or part of the user DB 106a, the flight DB 106b, the member DB 106c, the travel history DB 106d and the facility DB 106e stored in an external server.

The communication unit 108 is connected to the network NW and transmits and receives data via the network NW. The communication unit 108 communicates with the check-in terminal 20, the signage terminal 30, the mobile terminal 40, the facility terminal 50, and the like under the control of the CPU 102.

In such a way, the management server 10 is configured.

Figure 3:
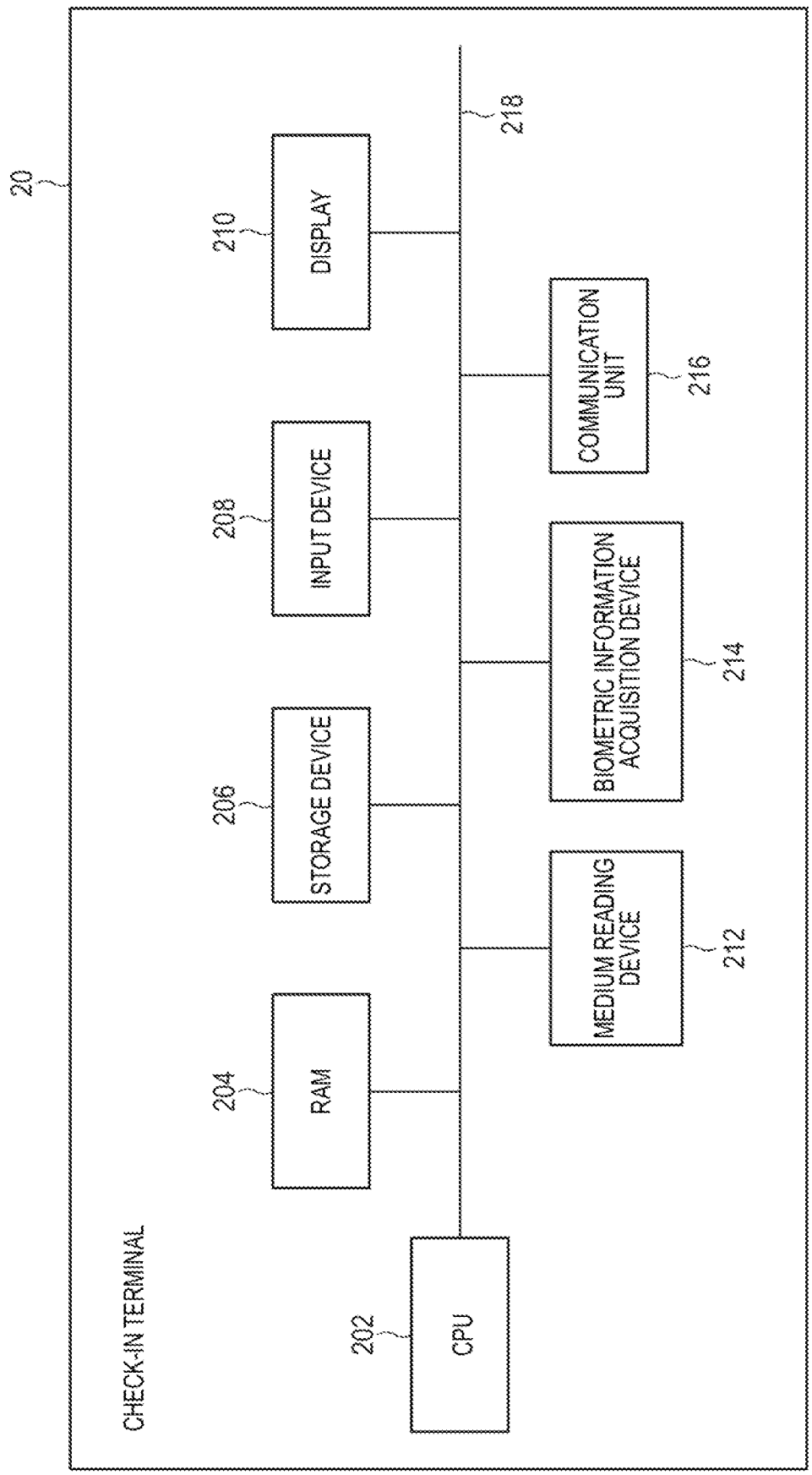
FIG. 3 is a block diagram illustrating an example of the hardware configuration of a check-in terminal according to the first example embodiment of the present invention.

Next, the configuration of the check-in terminal 20 will be described with reference to FIG. 3. FIG. 3 is a block diagram illustrating an example of the hardware configuration of the check-in terminal 20. The check-in terminal 20 is an automatic check-in terminal operated by the user U to perform the check-in procedure (boarding procedure). The check-in terminal 20 may be a check-in terminal installed at a manned counter operated by an employee of an airline company. The check-in procedure (boarding procedures) is procedure in which information for at least identifying the user U who is scheduled to board on the flight of the aircraft is entered for registration.

As illustrated in FIG. 3, the check-in terminal 20 has a CPU 202, a RAM 204, a storage device 206, an input device 208, and a display 210. Furthermore, the check-in terminal 20 has a medium reading device 212, a biometric information acquisition device 214, and a communication unit 216. The CPU 202, the RAM 204, the storage device 206, the input device 208, the display 210, the medium reading device 212, the biometric information acquisition device 214 and the communication unit 216 are connected to a bus line 218.

The CPU 202 operates by executing a program stored in the storage device 206 and functions as a control unit to control the overall operation of the check-in terminal 20. Further, the CPU 202 executes application programs stored in the storage device 206 to execute various processes as the check-in terminal 20. The RAM 204 provides a memory area required for the operation of the CPU 202.

The storage device 206 is formed of a storage medium such as a nonvolatile memory, a hard disk drive, or the like and functions as a storage unit. The storage device 206 stores programs executed by the CPU 202, data referenced by the CPU 202 in execution of the program, and the like.

The input device 208 is, for example, a touch panel embedded in the display 210. The input device 208 functions as an input unit that accepts an input of an instruction from the user U. The user U may input various kinds of information and input instructions for executing processing to the check-in terminal 20 via the input device 208.

The display 210 functions as a display unit that displays and outputs various screens to the user U who uses the check-in terminal 20. For example, the display 210 displays a guide screen that guides how to use the check-in terminal 20 and a notification screen for the user U.

The medium reading device 212 functions as an information acquisition unit that reads the passport and the airline ticket media of the user U to acquire information recorded in the passport and the airline ticket. The airline ticket medium is, for example, a paper air ticket, a portable terminal displaying an e-ticket stub, or the like. The medium reading device 212 is formed of, for example, a code reader, an image scanner, a contactless IC (Integrated Circuit) reader, an OCR (Optical Character Reader) device, or the like, and acquires information from various media held over the reading unit thereof.

The biometric information acquisition device 214 functions as a biometric information acquisition unit that acquires the face image of the user U as biometric information of the user U who performs the check-in procedure. The biometric information acquisition device 214 is, for example, a digital camera that captures the face of the user U standing in front of the check-in terminal 20, and captures a face image of the user U. Note that the biometric information acquisition device 214 is not limited to a device that acquires a face image of the user U as the biometric information of the user U, but may be a device that acquires a fingerprint image, an iris image, a finger vein image, a palm print image, a palm vein image, or the like.

The communication unit 216 is connected to the network NW and transmits and receives data via the network NW. The communication unit 216 communicates with the management server 10 or the like under the control of the CPU 202.

In such a way, the check-in terminal 20 is configured.

Figure 4:
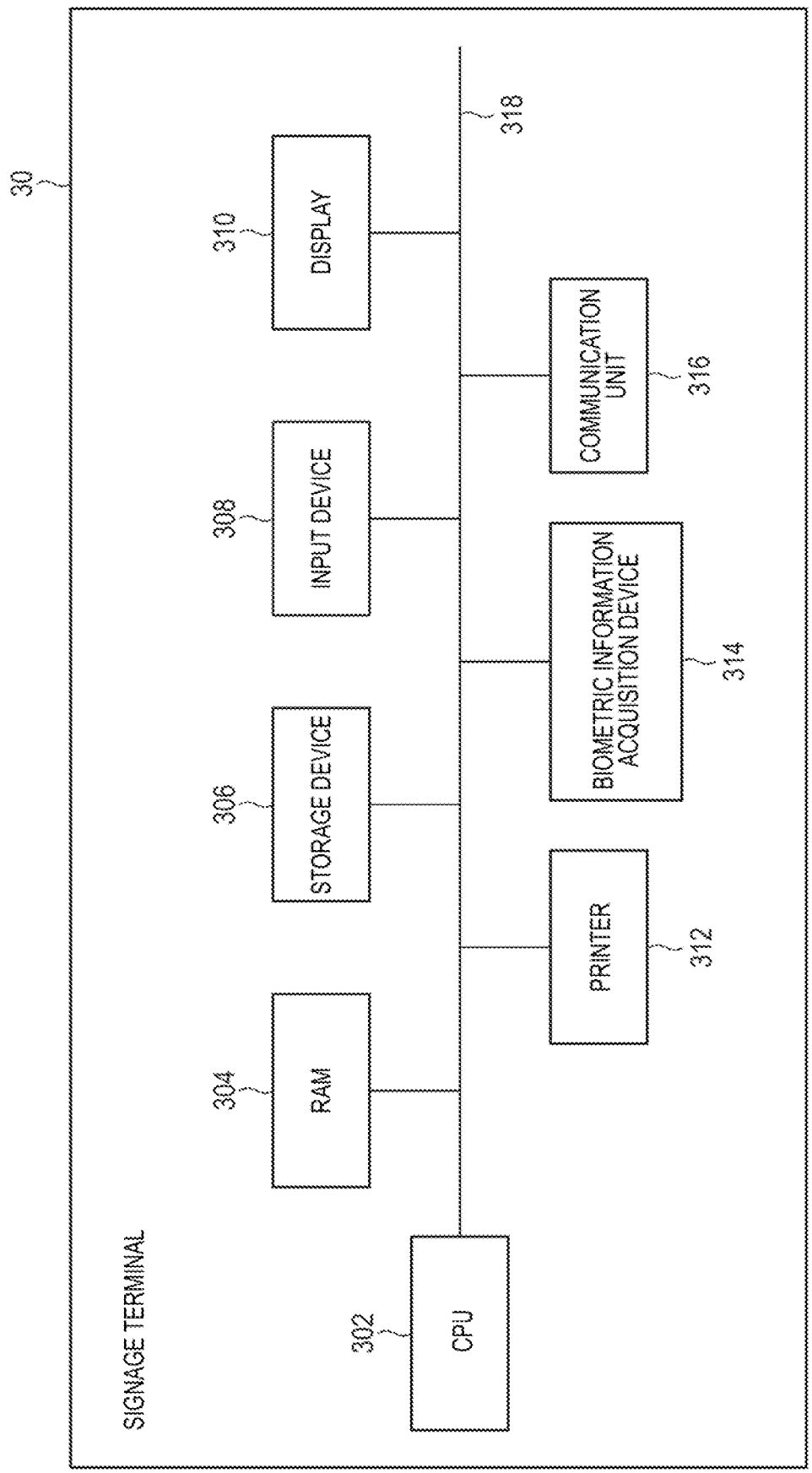
FIG. 4 is a block diagram illustrating an example of the hardware configuration of a signage terminal according to the first example embodiment of the present invention.

Next, the configuration of the signage terminal 30 will be described with reference to FIG. 4. FIG. 4 is a block diagram illustrating an example of the hardware configuration of the signage terminal 30. The signage terminal 30 is an information processing terminal that displays and guides the user U about the facilities and services available to the user U and the flight of the aircraft on which the user U is scheduled to board. The guide related to the flight includes a guide related to actions to be taken by the user U in connection with the flight. The display executed in the signage terminal 30 is managed by the management server 10.

As illustrated in FIG. 4, the signage terminal 30 has a CPU 302, a RAM 304, a storage device 306, an input device 308, a display 310, a printer 312, a biometric information acquisition device 314, and a communication unit 316. The CPU 302, the RAM 304, the storage device 306, the input device 308, the display 310, the printer 312, the biometric information acquisition device 314 and the communication unit 316 are connected to a bus line 318.

The CPU 302 operates by executing a program stored in the storage device 306 and functions as a control unit to control the overall operation of the signage terminal 30. The CPU 302 executes application programs stored in the storage device 306 to execute various processes as the signage terminal 30. The RAM 304 provides a memory area required for the operation of the CPU 302.

The storage device 306 is formed of a storage medium such as a nonvolatile memory, a hard disk drive, or the like and functions as a storage unit. The storage device 306 stores programs executed by the CPU 302, data referenced by the CPU 302 in execution of the program, and the like.

The input device 308 is, for example, a touch panel embedded in the display 310. The input device 308 functions as an input unit that accepts an input of an instruction from the user U. The user U may input various kinds of information and input instructions for executing processing to the signage terminal 30 via the input device 308.

The display 310 functions as a display unit that displays and outputs various screens to the user U who uses the signage terminal 30. For example, the display 310 displays information related to facilities, services, and the like available to the user U, information related to the flight on which the user U is scheduled to board, and the like.

The printer 312 functions as a printer unit that prints out information to be provided to the user U on a medium such as paper or the like. For example, the printer 312 may print guide of the same content as the guide displayed on the display 310, various kinds of tickets, and the like on a medium such as paper or the like.

The biometric information acquisition device 314 functions as a biometric information acquisition unit that acquires a face image of the user U as biometric information of the user U in front of the signage terminal 30. The biometric information acquisition device 314 is, for example, a digital camera that captures the front of the signage terminal 30, and captures a face image of the user U. The biometric information acquisition device 314 is not limited to a device that acquires a face image of the user U as the biometric information of the user U, but may be a device that acquires a fingerprint image, an iris image, a finger vein image, a palm print image, a palm vein image, or the like.

The communication unit 316 is connected to the network NW and transmits and receives data via the network NW. The communication unit 316 communicates with the management server 10 or the like under the control of the CPU 302.

In such a way, the signage terminal 30 is configured.

Figure 5:
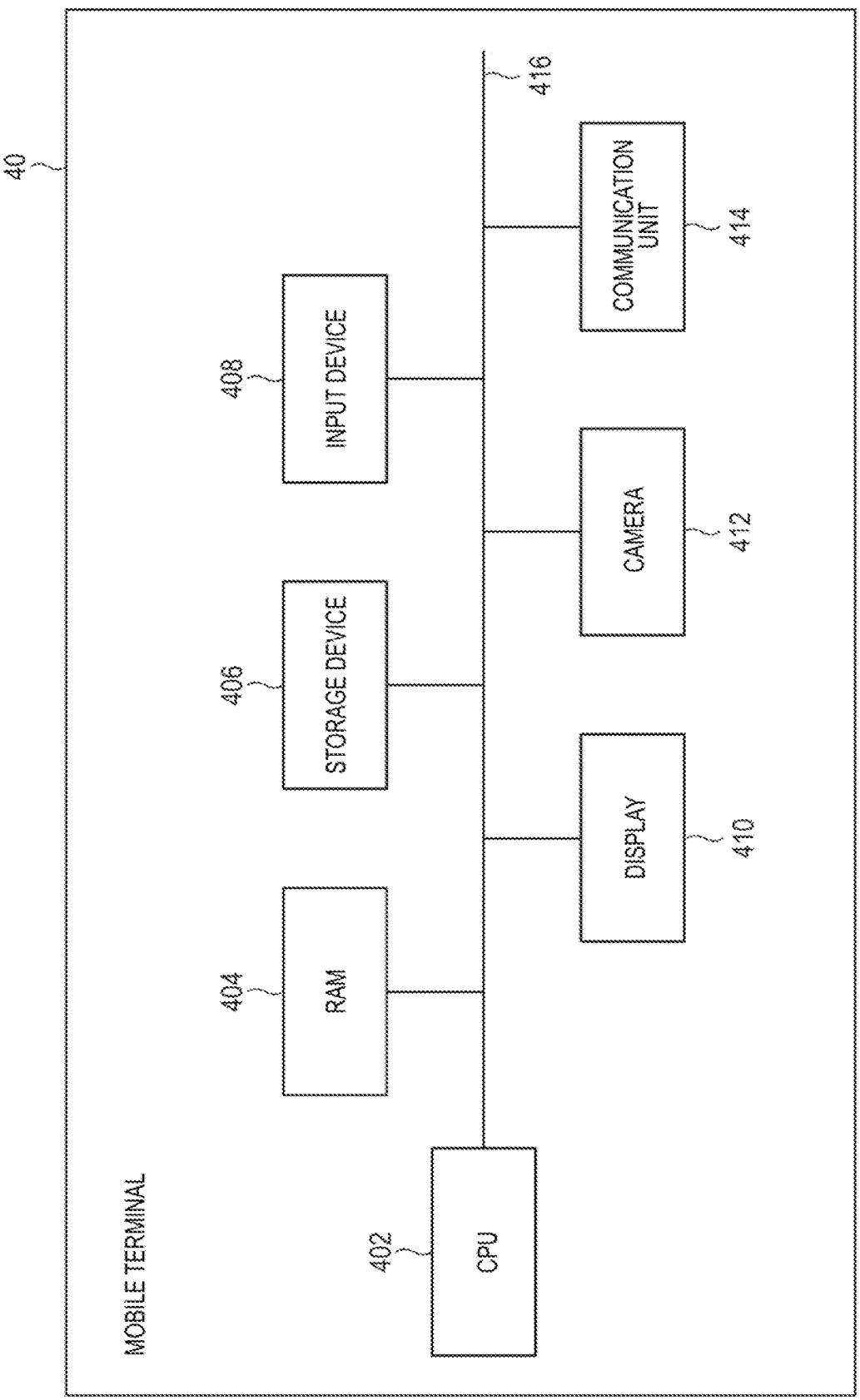
FIG. 5 is a block diagram illustrating an example of the hardware configuration of a mobile terminal according to the first example embodiment of the present invention.

Next, the configuration of the mobile terminal 40 will be described with reference to FIG. 5. FIG. 5 is a block diagram illustrating an example of the hardware configuration of the mobile terminal 40. The mobile terminal 40 is an information processing terminal carried and used by the user U, such as a smartphone, a tablet terminal, a mobile phone, or the like.

As illustrated in FIG. 5, the mobile terminal 40 has a CPU 402, a RAM 404, a storage device 406, an input device 408, a display 410, a camera 412, and a communication unit 414. The CPU 402, the RAM 404, the storage device 406, the input device 408, the display 410 and the communication unit 414 are connected to the bus line 416.

The CPU 402 operates by executing a program stored in the storage device 406 and functions as a control unit to control the overall operation of the mobile terminal 40. The CPU 402 executes application programs stored in the storage device 406 to execute various processes as the mobile terminal 40. The RAM 404 provides a memory area required for the operation of the CPU 402.

The storage device 406 is formed of a storage medium such as a nonvolatile memory, a hard disk drive, or the like and functions as a storage unit. The storage device 406 stores programs executed by the CPU 402, data referenced by the CPU 402 in execution of the program, and the like.

The input device 408 is, for example, a touch panel embedded in the display 410. The input device 408 functions as an input unit that accepts an input of an instruction from the user U. The user U may input various kinds of information and input instructions for executing processing to the mobile terminal 40 via the input device 408.

The display 410 functions as a display unit that displays and outputs various screens to the user U.

The camera 412 is a digital camera that functions as a capture unit that acquires images or videos. The camera 412 constitutes a code scanner that reads a code symbol together with the CPU 402 that performs reading processing of a code symbol such as a QR code (registered trademark) or the like captured by the camera 412.

The communication unit 414 connects to the network NW via a mobile communication network under the control of the CPU 402. The communication protocol of the communication unit 414 are not particularly limited and may be, for example, the third generation mobile communication scheme, the Long Term Evolution (LTE) scheme, the fourth generation mobile communication scheme, the fifth generation mobile communication scheme, or the like.

In such a way, the mobile terminal 40 is configured.

Figure 6:
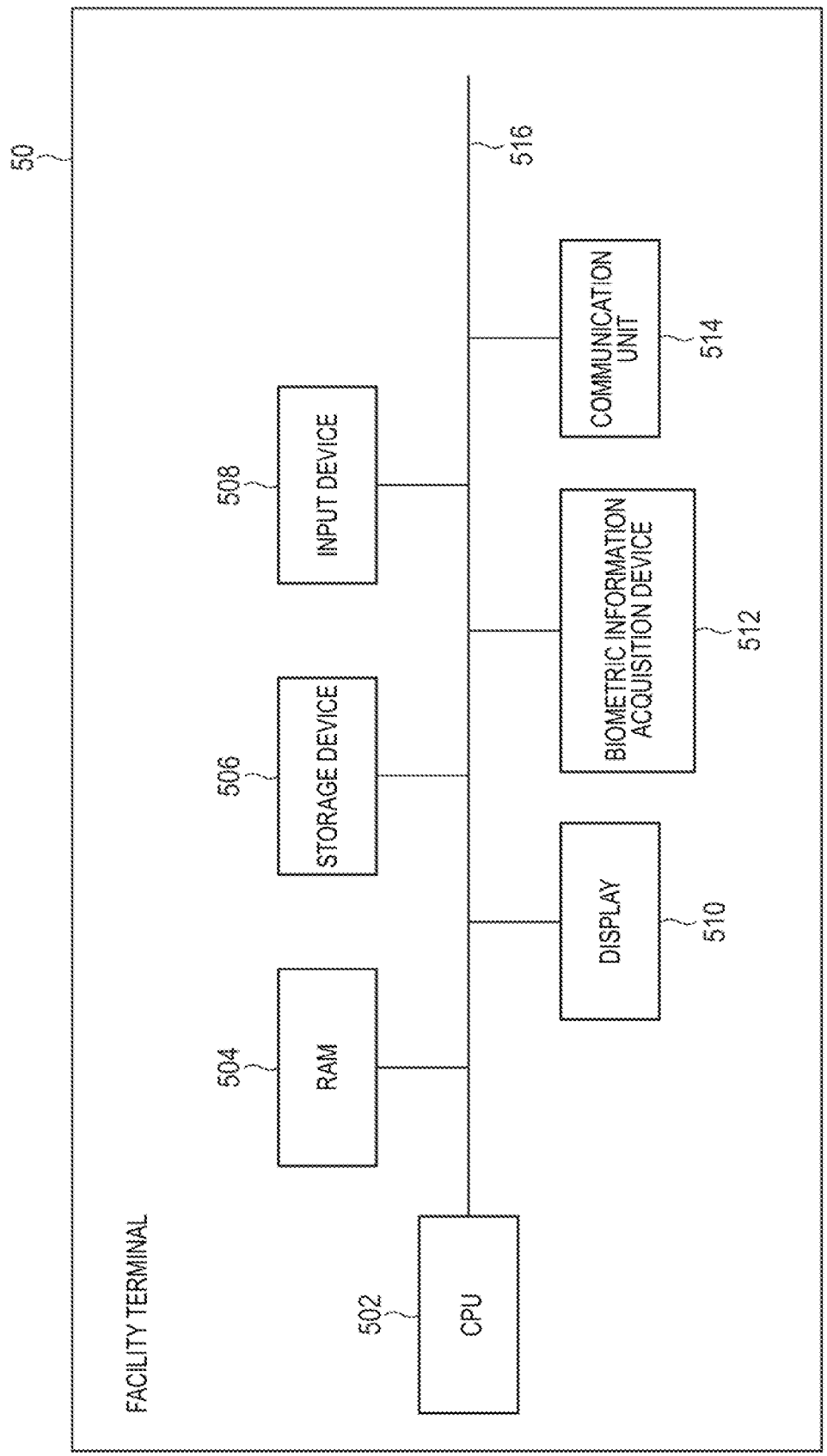
FIG. 6 is a block diagram illustrating an example of the hardware configuration of a facility terminal according to the first example embodiment of the present invention.

Next, the facility terminal 50 will be described with reference to FIG. 6. FIG. 6 is a block diagram illustrating an example of the hardware configuration of the facility terminal 50. The facility terminal 50 is an information processing terminal that is installed at, for example, an entrance or the like of a facility F such as a lounge or the like in the airport A and displays availability to the user U.

As illustrated in FIG. 6, the facility terminal 50 has a CPU 502, a RAM 504, a storage device 506, an input device 508, a display 510, a biometric information acquisition device 512, and a communication unit 514. The CPU 502, the RAM 504, the storage device 506, the input device 508, the display 510, the biometric information acquisition device 512 and the communication unit 514 are connected to a bus line 516.

The CPU 502 operates by executing a program stored in the storage device 506 and functions as a control unit to control the overall operation of the facility terminal 50. The CPU 502 executes application programs stored in the storage device 506 to execute various processes as the facility terminal 50. The RAM 504 provides a memory area required for the operation of the CPU 502.

The storage device 506 is formed of a storage medium such as a nonvolatile memory, a hard disk drive, or the like and functions as a storage unit. The storage device 506 stores programs executed by the CPU 502, data referenced by the CPU 502 in execution of the program, and the like.

The input device 508 is, for example, a touch panel embedded in the display 510. The input device 508 functions as an input unit that accepts an input of an instruction from the user U. The user U may input various kinds of information and input instructions for executing processing to the facility terminal 50 via the input device 508.

The display 510 functions as a display unit that displays and outputs various screens to the user U.

The biometric information acquisition device 512 functions as a biometric information acquisition unit that acquires a face image of the user U as biometric information of the user U in front of the facility terminal 50. The biometric information acquisition device 512 is, for example, a digital camera that captures the front of the facility terminal 50, and captures a face image of the user U. The biometric information acquisition device 512 is not limited to a device that acquires a face image of the user U as the biometric information of the user U, but may be a device that acquires a fingerprint image, an iris image, a finger vein image, a palm print image, a palm vein image, or the like.

The communication unit 514 is connected to the network NW and transmits and receives data via the network NW. The communication unit 514 communicates with the management server 10 or the like under the control of the CPU 502.

In such a way, the facility terminal 50 is configured.

The information processing system 1 according to the present example embodiment guides, for the user U who is scheduled to board on an aircraft at the airport A, facilities or services available to the user U in the airport A according to the status of the user U. Here, the status of the user U is a rank or qualification that is ranked and classified based on the past flight records of the user U on aircraft, such as the flight distance or section distance of the aircrafts on which the user U has boarded in the past, the fares paid for using the aircrafts, and the like. The facilities or the services available to the user U vary depending on the status. For example, users U with more advanced status have access to more valuable facilities or services.

The operation of each component in the information processing system 1 according to the present example embodiment will be described below with reference to FIG. 7 to FIG. 18.

Figure 7:
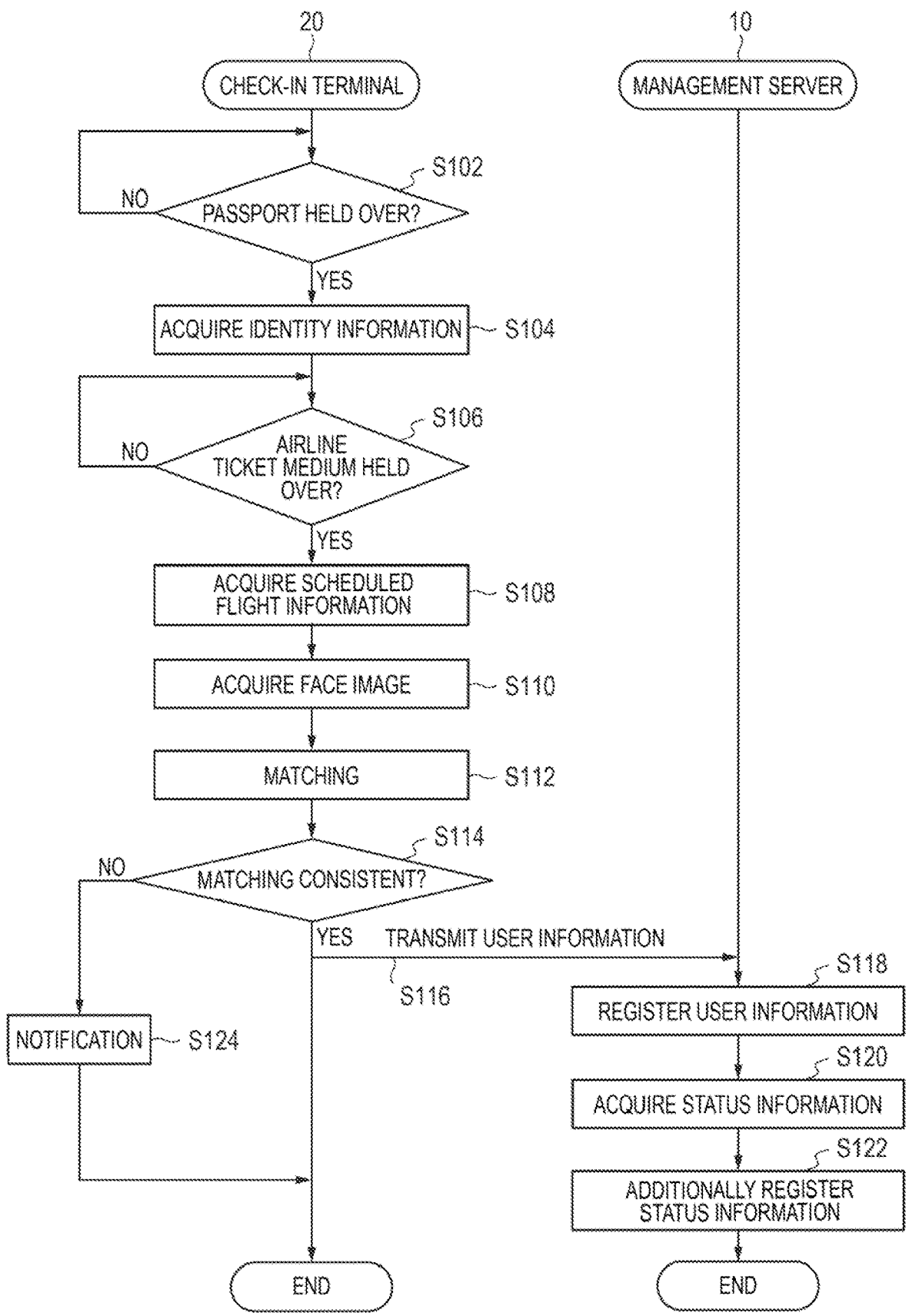
FIG. 7 is a sequence diagram illustrating the operations of the check-in terminal and the management server in the information processing system according to the first example embodiment of the present invention.

First, the operations of the check-in terminal 20 and the management server 10 will be described with reference to FIG. 7 to FIG. 10. FIG. 7 is a sequence diagram illustrating the operations of the check-in terminal 20 and the management server 10. FIG. 8 is a schematic diagram illustrating an example of the user DB 106a. FIG. 9 is a schematic diagram illustrating an example of the flight DB 106b. FIG. 10 is a schematic diagram illustrating an example of the member DB 106c. FIG. 11 is a schematic diagram illustrating an example of the travel history DB 106d.

Upon arrival at the airport A, the user U performs the check-in procedure at the check-in terminal 20. The check-in terminal 20 and the management server 10 execute the processing illustrated in FIG. 7 whenever each of the multiple users U performs the check-in procedure.

Note that the user U may also perform the check-in procedure through web check-in or online check-in in place of the check-in procedure at the check-in terminal 20. In this case, the user U may access the web page of the airline or its affiliate company through an information processing terminal used by the user U, such as a home computer, the mobile terminal 40 or the like, and perform the check-in procedure through the web page. The server providing the web page or another server capable of communicating with the server may accept inputs of various information from the information processing terminal by the user U via the web page and execute the same processing as the check-in terminal 20 described below.

As illustrated in FIG. 7, the medium reading device 212 of the check-in terminal 20 determines whether or not the passport of the user U is held over the reading unit thereof (step S102) and waits until the passport is held over (step S102, NO).

When the medium reading device 212 determines that the passport is held over (step S102, YES), the medium reading device 212 acquires the identity information of the user U including the passport information from the passport which has been held over (step S104). The identity information is information related individually to the user U, such as the name, the nationality, the sexuality, and the date of birth, or the like of the user U. The identity information may also be acquired from the airline ticket medium of the user U. In addition, the passport information included in the identity information includes the passport number, the country issuing the passport and the passport face image which is a face image of the user U, and the like. Note that the CPU 202 of the check-in terminal 20 can change the display language in the display 210 to a language such as the official language of the country concerned according to the nationality of the user U identified by the identification information.

Next, the medium reading device 212 determines whether or not the airline ticket medium of the user U is held over the reading unit thereof (step S106), and waits until the airline ticket medium is held over (step S106, NO).

When the medium reading device 212 determines that the airline ticket medium is held over (step S106, YES), the medium reading device 212 acquires the scheduled flight information of the user U from the airline ticket medium which has been held over (step S108). The scheduled flight information of the user U includes information related to the flight on which the user U is scheduled to board and is boarding information related to the boarding of the user U. The scheduled flight information includes, for example, the airline, the flight number, the departure place, the arrival place, the departure date and time, the arrival date and time, the seat class, and the like of the aircraft on which the user U is scheduled to board. Note that the CPU 202 of the check-in terminal 20 may acquire the scheduled flight information of the user U from the server of the airline company by inquiring the reservation and purchase information of the airline ticket to the server of the airline company based on the passport information of the user U.

The medium reading device 212 may also acquire the identity information of the user U from the airline ticket medium. For example, the medium reading device 212 may acquire the membership number of the user U in a point program operated by the airline or its affiliate company as the identification information of the user U. In the point program, for example, the status of the user U is ranked and classified into several categories according to the number of points granted to the user U according to the number of flights the user U has boarded on operated by the airline or airlines of the alliance the airline belongs to. For example, more points are awarded for higher boarding record on the aircrafts such as the longer flight distance or section distance of the aircrafts on board, the higher fare paid for using the aircrafts, the higher grade of the seat class, and the like. In addition, the higher the number of points accumulated in a certain period in the past, the more advanced the status of the user U becomes among the plurality of statuses. The name of point in the point program is, for example, mile, mileage, or the like, although not particularly limited. In addition, the names of plurality of statuses are not particularly limited and may be names which are distinguished from each other. Note that the medium reading device 212 may also acquire the status of the user U from the airline ticket medium as the identity information of the user U.

The more advanced the status of the user U is, the more valuable facilities the user U can use and the more valuable services they can receive. For example, at the airport A, the user U with a more advanced status can use a dedicated facility F such as a lounge or the like. In addition, for example, the user U with a certain advanced status can receive preferential services such as discount services or the like at stores such as duty-free shops. In addition, for example, the user U with a certain advanced status can use a priority lane where the user U has priority access to the security procedure at the security inspection area. In addition, for example, the user U with a certain advanced status can use a priority lane, which gives the user U priority in the departure examination procedure at the departure examination area. Also, for example, the user U with a certain advanced status can board on the aircraft preferentially at the boarding gate.

Note that the check-in terminal 20 may acquire not only the identity information and the scheduled flight information from the passport and the airline ticket medium but also acquire the identity information and the scheduled flight information by other means. For example, the CPU 202 can query the server of the airline company for the reservation and purchase information of the airline ticket based on the credit card number, the reservation number, the confirmation number, or the like of the user U, and acquire the identity information and the scheduled flight information of the user U from the server of the airline company.

Next, the biometric information acquisition device 214 of the check-in terminal 20 captures the face of the user U standing in front of the check-in terminal 20, and acquires a captured face image that is a face image of the user U (step S110).

Note that the order of step S104 to acquire the identity information, step S108 to acquire the boarding information, and step S110 to acquire the face image is not limited to the above case. Any of steps S104, S108, and S110 may be performed in the preceding order, or all or some set of steps S104, S108, and S110 may be performed simultaneously.

Next, the CPU 202 of the check-in terminal 20, which functions as a matching unit, performs matching of the captured face image captured by the biometric information acquisition device 214 and the passport face image acquired by the medium reading device 212 at 1:1 (step S112). When matching the captured face image and the passport face image, the CPU 202 can match the both face images by matching the face feature amount extracted from the captured face image and the face feature amount extracted from the passport face image. The CPU 202 functions as a determination unit and can determine that the matching of the two face images is consistent when, for example, the similarity of the two face images shows a high similarity equal to or greater than a standard.

Note that, instead of functioning as the matching unit, the CPU 202 can be configured to request matching of the face images of the user U to an external server such as the management server 10 or the like and acquire the matching result from the external server. In this case, the CPU 202 can request matching of the face images by sending the passport face image and the captured face image of the user U or the feature amounts extracted from the respective face images to the external server.

As a result of the matching, when matching of the captured face image and the passport face image is determined to be consistent and the identification is determined to be successful (step S114, YES), the CPU 202 functions as a transmission unit and transmits user information of the user U to the management server 10 via the network NW (step S116). The user information includes the identity information, face information and the scheduled flight information of the user U associated with each other. The face information is the captured face image or the passport face image of the user U via the matching by the CPU 202. The face information may be either the captured face image or the passport face image, or both of the images. The face information need not be the captured face image or the passport face image itself, but may be the face feature amount extracted from the captured face image or the passport face image.

When the CPU 102 of the management server 10 receives the user information from the check-in terminal 20, the CPU 102 functions as a registration unit and registers the received user information in the user DB 106a (step S118). The CPU 102 registers the captured face image or the passport face image included in the user information as a registered face image in the user DB 106a. The CPU 102 registers the identity information included in the user information of the user U, the registered face image as the face information, scheduled flight information and status information in the user DB 106a by associating them with each other. Thus, the check-in terminal 20 completes the check-in procedure for the user U.

FIG. 8 illustrates an example of the user DB 106a of the management server 10. The user DB 106a is a database in which sets of the user information, which is information related to the multiple users U who have completed the check-in procedure at the check-in terminal 20, are registered. As illustrated in the figure, in the user DB 106a, the identity information, the face information and the scheduled flight information of the user U are registered for each user ID (Identification), which is an identifier for identifying the multiple users U. The identity information includes, for example, the name, the passport number, the membership number, and the like. The face information is the registered face image. The scheduled flight information is the boarding information related to the boarding of the user U and includes, for example, the flight number, the departure place, the arrival place, the departure time, the boarding gate, the seat class, and the like. Note that the identity information and the scheduled flight information may each include information other than that illustrated in FIG. 8. In the user DB 106a, as described later, the status information indicating the status of the user U is additionally registered as part of the user information. The identity information, the face information, the scheduled flight information and the status information included in the user information of the user U are registered in association with each other.

Note that the CPU 102 functions as an acquisition unit and may also acquire the scheduled flight information of the user U to be registered in the user DB 106a by referring to the flight DB 106b. The flight DB 106b has the latest flight information. The latest flight information is the latest information related to the flights of the aircraft operated at the airport A.

FIG. 9 illustrates an example of the flight DB 106b of the management server 10. The flight DB 106b is a database in which sets of the latest flight information for multiple flights operated at the airport A are registered. As illustrated in the figure, the latest flight information is registered in the flight DB 106b for each flight ID that identifies multiple flights operated at the airport A. The latest flight information includes, for example, the flight number, the departure place, the arrival place, the departure time, the arrival time, the boarding gate, the boarding start time, flight status, and the like. Note that the latest flight information may include information other than that illustrated in FIG. 9. In the latest flight information registered in the flight DB 106b, if there is any change in the flight status such as cancellation or delay, the change will be reflected in real time or as needed. The term "cancellation" may include the meaning of the term "suspension of service" or be replaced with the term "suspension of service".

The CPU 102 may refer to the flight DB 106b and, based on the flight number of the flight on which the user U is scheduled to board, acquire more detailed information such as the boarding gate, the boarding start time, and the like, as the scheduled flight information of the user U to be registered in the user DB 106a.

Next, as illustrated in FIG. 7, the CPU 102 functions as an acquisition unit to acquire the status information of the user U (step S120). The CPU 102 can acquire the status information of the user by referring to the member DB 106c.

FIG. 10 illustrates an example of the member DB 106c of the management server 10. The member DB 106c is a database in which member information that is information related to multiple members of the point program operated by the airline or its affiliate company as described above. As illustrated in the figure, the member information is registered in the member DB 106c for each membership number, which is an ID that identifies multiple members who participate in the point program. The member information includes, for example, the name, the status, the number of points, and the like. The status is a status set for the user U, ranked based on the number of points awarded to the user U according to the boarding record on the aircrafts. In addition, the number of points is the total number of points awarded in a certain period in the past.

Based on the membership number of the user U included in the user information registered in the user DB 106a, the CPU 102 can acquire the status information indicating the status of the user U from the member DB 106c by referring to the member DB 106c.

The CPU 102 can also determine the status of the user U based on the travel history of the user U registered in the travel history DB 106d, instead of acquiring the status information of the user U from the member DB 106c.

FIG. 11 illustrates an example of the travel history DB 106d of the management server 10. Note that the travel history DB 106d may, for example, be stored in an external server separate from the management server 10 operated by an agency that controls immigration and emigration, for example. The travel history DB 106d is a database in which sets of the travel history information, which is information related to the travel history of multiple persons who have entered or departed the country in the past, are registered. As illustrated in the figure, the travel history information is registered in the travel history DB 106d for each individual ID that identifies multiple persons. The travel history information includes, for example, the name, the passport number, the face information, the travel history, and the like. The travel history is a record of the person's entry or departure, including, for example, the place of departure, the place of arrival, the date of entry or departure, the flight number of the aircraft on which the person boarded, and the like. Note that the travel history information may include information other than that illustrated in FIG. 11.

Based on the name, the passport number, the face information, or the like of the user U included in the user information registered in the user DB 106a, the CPU 102 can acquire the past travel history of the user U from the travel history DB 106d by referring to the travel history DB 106d. Furthermore, the CPU 102 can evaluate the boarding record of the user U on the aircrafts based on the acquired travel history of the user U in a certain period in the past, and determine a status similar to that acquired from the member DB 106c for the user U, for example. Specifically, the CPU 102 can determine a more advanced status for the user U the longer the flight or section distance of the aircrafts on which the user U has boarded in a certain period of time in the past becomes.

Next, the CPU 102 additionally registers the status information indicating the status of the user U in the user DB 106a as illustrated in FIG. 7 (step S122). The CPU 102 additionally registers the status information as a part of the user information in association with the identity information, the face information and the scheduled flight information included in the user information of the user U.

Thus, the CPU 102 registers the identity information, the face information, the scheduled flight information and the status information in the user DB 106a for the user U who has performed the check-in procedure.

On the other hand, as a result of the matching, when the CPU 202 determines that the identity verification has failed because the matching of the captured face image and the passport face image is not consistent (step S114, NO), the CPU 202 functions as a notification unit and notifies the user U that the identity verification has failed (step S124). At this time, the CPU 202 causes the display 210 to display a notification screen to inform the user that the identity verification has failed. Note that the CPU 202 can also notify the user U of the failure of identification, for example, by voice, along with or instead of displaying the notification screen.

Thus, the check-in procedure of the user U is performed at the check-in terminal 20.

Note that the user U may perform the check-in procedure at a manned check-in counter instead of the check-in procedure by the check-in terminal 20. In this case, the terminal operated by the employee of the check-in counter may perform the same processing as the check-in terminal 20 described above. The user U may use online check-in from the website of the airline company instead of the check-in procedure by the check-in terminal 20. In this case, for example, the user U can separately register the face image as the registered face image in the user DB 106a of the management server 10 from a dedicated terminal installed at the airport A.

Figure 12:
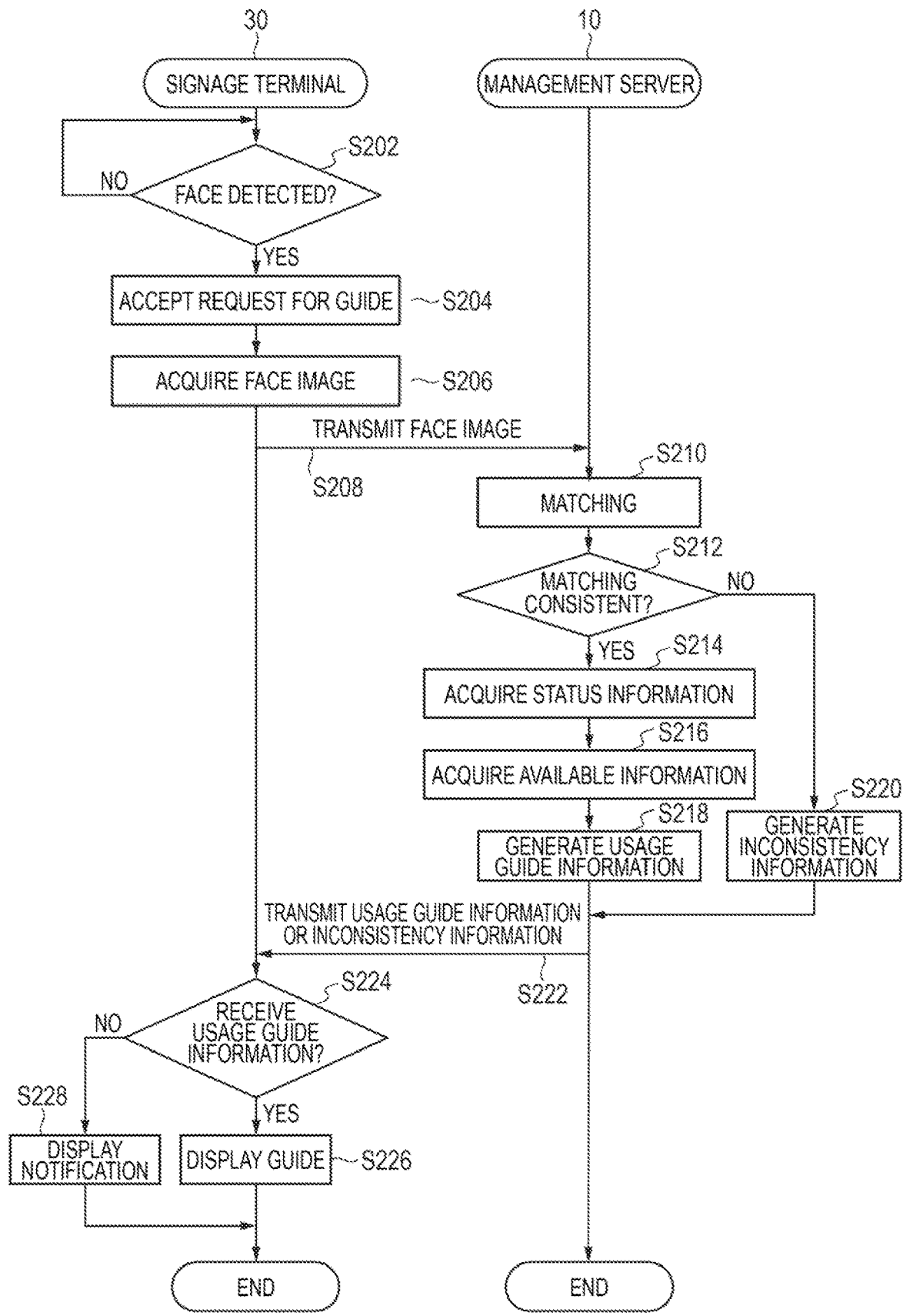
FIG. 12 is a sequence diagram illustrating the operations of the signage terminal and the management server in the information processing system according to the first example embodiment of the present invention.
Figure 13:
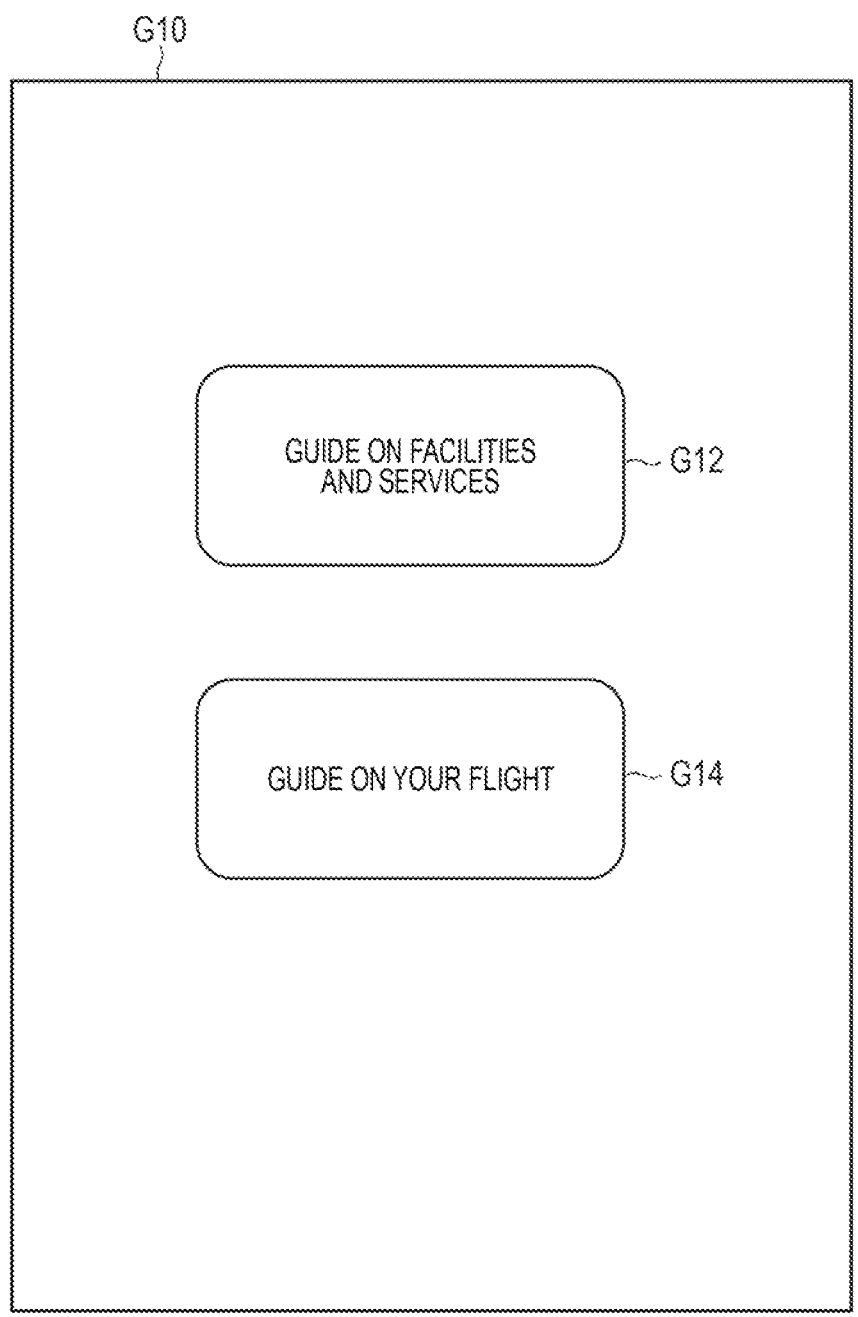
FIG. 13 is a schematic diagram illustrating an example of a reception screen displayed in the signage terminal according to the first example embodiment of the present invention.
Figure 14:
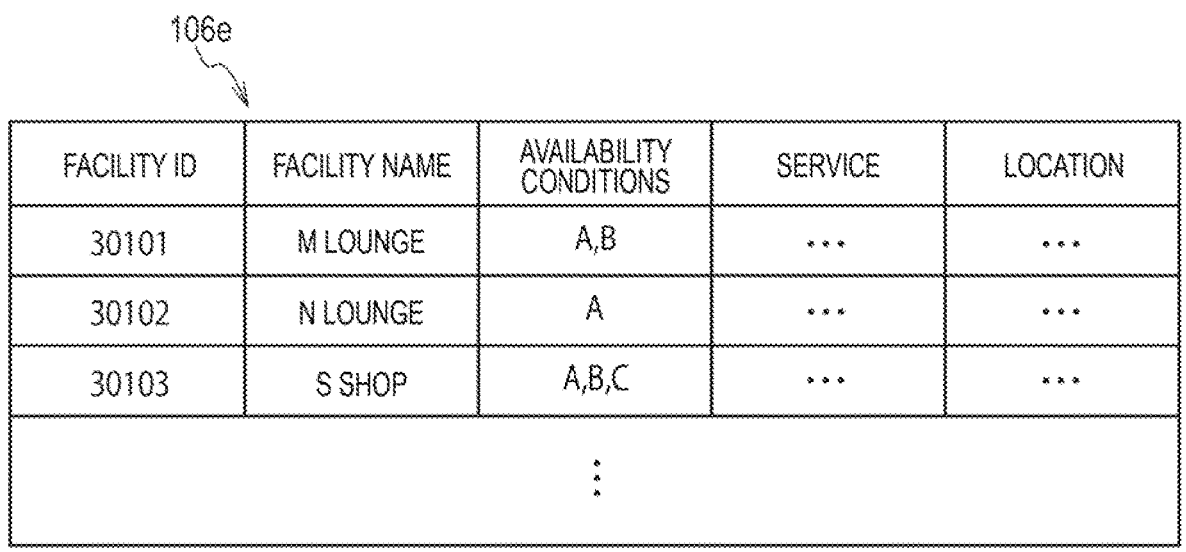
FIG. 14 is a schematic diagram illustrating an example of a facility database of the management server according to the first example embodiment of the present invention.
Figure 15:
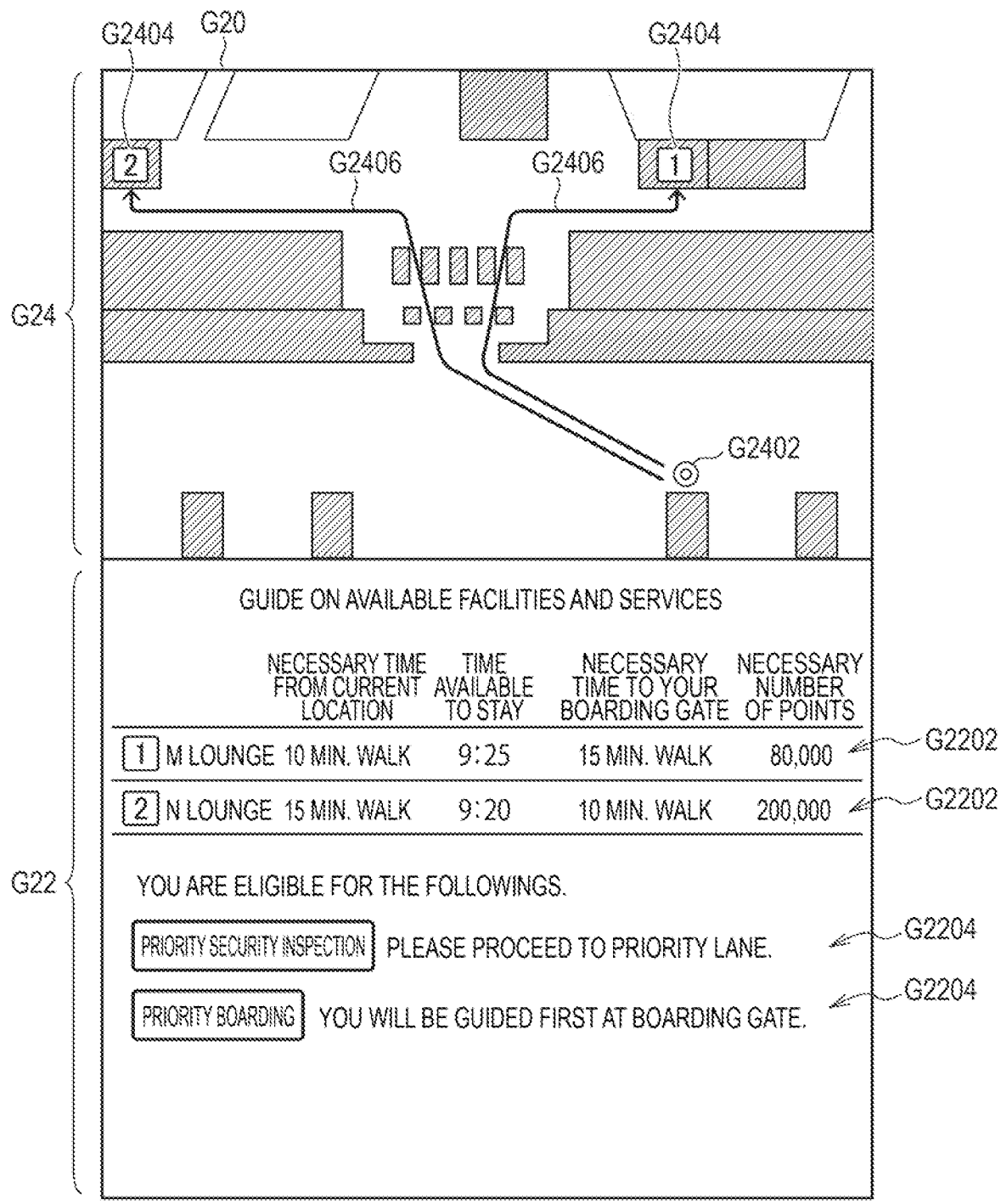
FIG. 15 is a schematic diagram illustrating an example of a guide screen displayed in the signage terminal by first example embodiment of the present invention.
Figure 16:
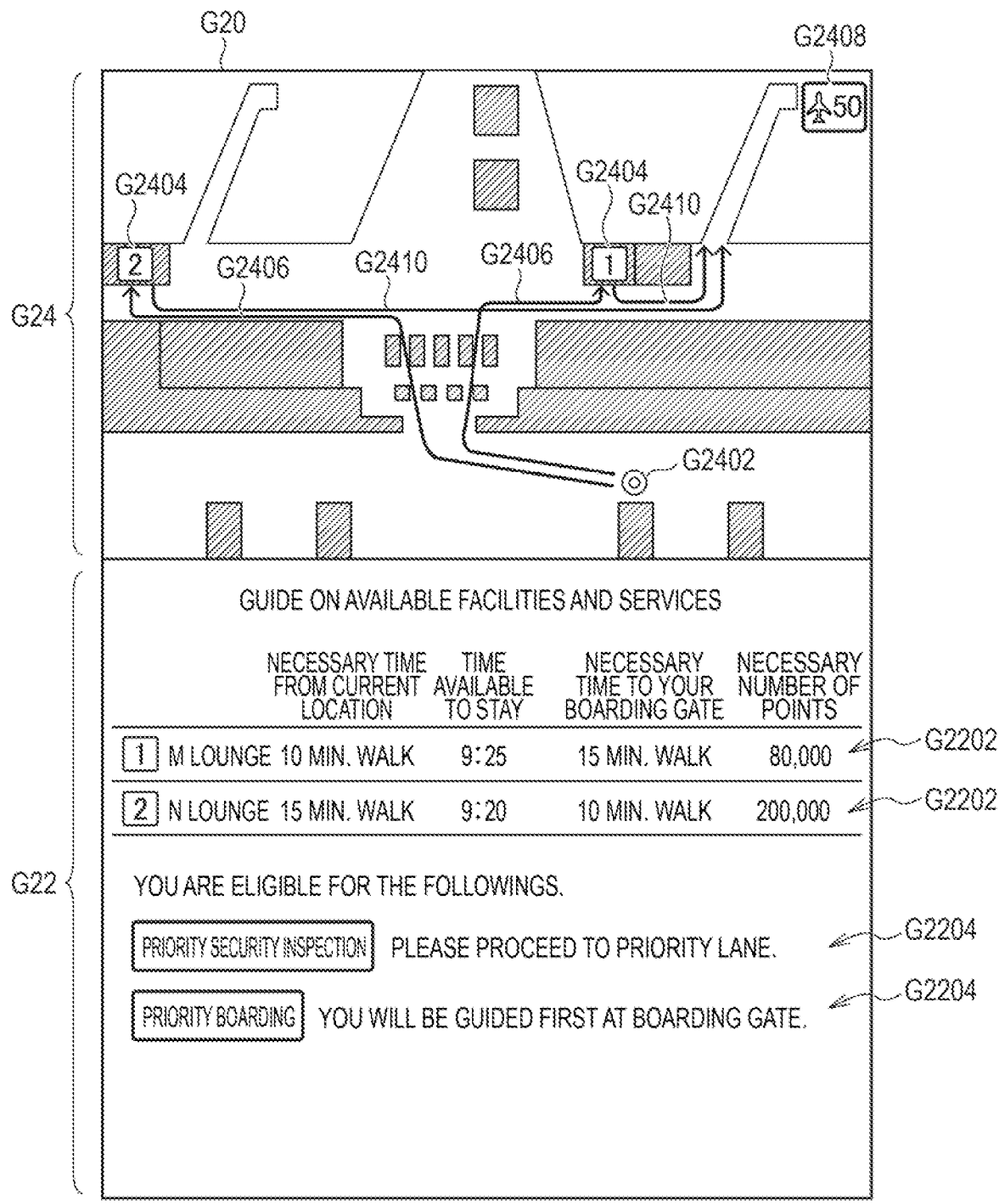
FIG. 16 is a schematic diagram illustrating an example of a guide screen displayed in the signage terminal according to the first example embodiment of the present invention.
Figure 17:
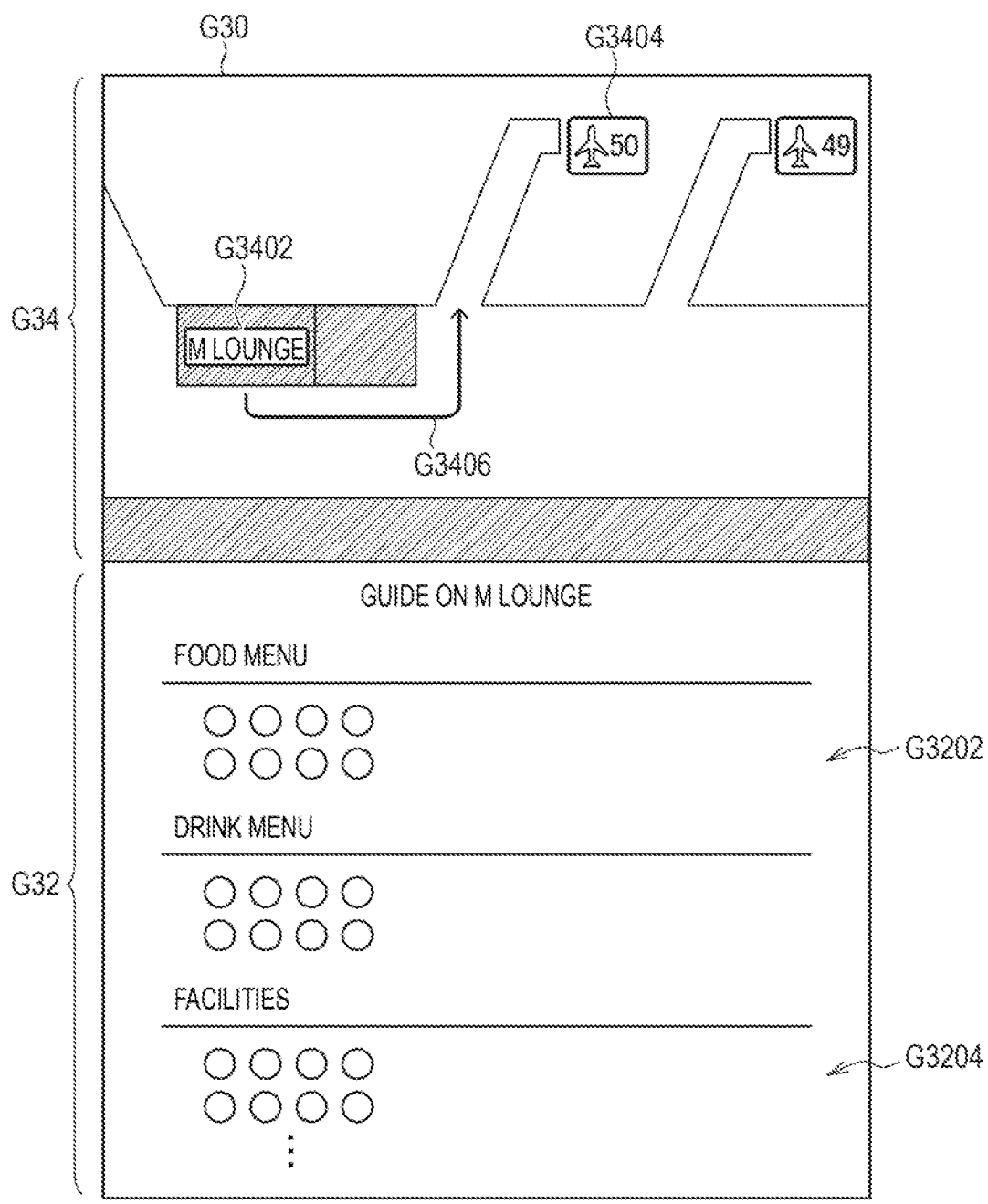
FIG. 17 is a schematic diagram illustrating an example of a guide screen displayed in the signage terminal according to the first example embodiment of the present invention.

Next, the operations of the signage terminal 30 and the management server 10 will be described with reference to FIG. 12 to FIG. 17. FIG. 12 is a sequence diagram illustrating the operations of the signage terminal 30 and the management server 10. FIG. 13 is a schematic diagram illustrating an example of a reception screen displayed in the signage terminal 30. FIG. 14 is a schematic diagram illustrating an example of the facility DB 106e of the management server 10. FIG. 15 to FIG. 17 are schematic diagrams illustrating examples of guide screens displayed in the signage terminal 30, respectively.

Upon completion of the check-in procedure, the user U shall proceed to a baggage check-in procedure at the baggage counter as necessary, and then proceed to the boarding gate after undergoing the security inspection at the security inspection area and the departure examination at the departure examination area. Until boarding the aircraft at the boarding gate, which is the boarding area for the aircraft, the user U can receive various guides from the signage terminal 30. That is, in the signage terminal 30, the user U can receive a guide related to the facilities or the services available to the user U, a guide related to the flight on which the user U is scheduled to board, and the like. The guide related to the flight includes a guide related to actions to be taken by the user U in connection with the flight.

As illustrated in FIG. 12, the biometric information acquisition device 314 of the signage terminal 30 constantly or periodically captures in front of the signage terminal 30 and determines whether or not the face of the user U in front of the signage terminal 30 is detected in the captured image (step S202). The biometric information acquisition device 314 waits until the face of the user U is detected in the image (step S202, NO).

When the CPU 302 of the signage terminal 30 determines that the biometric information acquisition device 314 has detected the face of the user U in the image (step S202, YES), the CPU 302 makes the display 310 display a reception screen for accepting an input of request for guide from the user U (step S204). Thus, the CPU 302 receives the input of request for guide from the user U.

FIG. 13 illustrates the reception screen G10 displayed on the display 310. As illustrated in the figure, on the reception screen G10, buttons G12 and G14 for inputting a guide request are displayed so as to be able to be input by touch. The user U can touch the button G12 to input a request for guide related to facilities or services available to the user U into the signage terminal 30. The user U can also touch the button G14 to input a request for guide related to the flight on which the user U is scheduled to board into the signage terminal 30.

Hereafter, in the present example embodiment, a case is described in which a request for guide related to facilities or services available to the user U is input by the user U in the signage terminal 30 and the user U receives the guide related to facilities or services available to the user U. A case in which a request for guide related to the flight on which the user U is scheduled to board is input by the user U in the signage terminal 30 and the user U receives the guide related to the flight on which the user U is scheduled to board will be described in a second example embodiment.

As illustrated in FIG. 12, when the user U inputs a request for guide related to facilities or services available to the user U, the biometric information acquisition device 314 captures the face of the user U and acquires a face image of the user U as a target face image (step S206).

Note that the signage terminal 30 may skip the process of accepting the request for guide in step S204 and move to step S206 of acquiring the target face image. In this case, when the biometric information acquisition device 314 determines that the face of the user U in front of the signage terminal 30 is detected in the captured image, the biometric information acquisition device 314 can capture the face of the user U and acquire a face image of the user U as the target face image.

Next, the CPU 302 functions as a transmission unit and transmits the target face image of the user U captured by the biometric information acquisition device 314 to the management server 10 via the network NW (step S208).

When the CPU 102 of the management server 10 receives the target face image from the signage terminal 30, the CPU 102 functions as a matching unit and performs matching of the face image of the user U (step S210). The CPU 102 performs 1:N matching of the target face image received from the signage terminal 30 and the plurality of registered face images registered in the user DB 106a. When the matching of the target face image and the passport face image is performed, the CPU 102 can match the both face images by matching the face feature amount extracted from the target face image and the face feature amount extracted from the registered face image. The CPU 102 functions as a determination unit and can determine that the matching of the two face images is consistent when, for example, the similarity of the two face images shows a high similarity equal to or greater than a standard. When a registered face image which is consistent with the target face image is found by the matching, the user U in front of the signage terminal 30 is identified.

Note that the CPU 302 of the signage terminal 30 can be configured to stream the video in front of the signage terminal 30 to the management server 10. In this case, instead of receiving the target face image from the signage terminal 30, the CPU 102 of the management server 10 can detect and acquire the target face image of the user U from the video streamed from the signage terminal 30.

When the user U in front of the signage terminal 30 is identified as a result of the matching (step S212, YES), the CPU 102 functions as an acquisition unit to acquire the status information of the user U from the user DB 106a (step S214). Referring to the user DB 106a, the CPU 102 acquires the status information associated with the registered face image which is consistent with the target face image as the status information of the user U. The CPU 102 can also acquire the seat class included in the scheduled flight information associated with the registered face image which is consistent with the target face image together with the status information.

Next, the CPU 102 functions as an acquisition unit and acquires available information based on the status information of the user U by referring to the facility DB 106e (step S216). The available information is information that indicates facilities or services available to the user U in the airport A. The CPU 102 can also acquire the available information based on the seat class of the user U. The CPU 102 can identify the services available to the user U based on the status or the seat class of the user U and acquire the available information related to the identified facilities or services. Note that the available information is not limited to facilities or services in the airport A, but may indicate facilities or services available to the user U outside the airport A. Note also that the available information may indicate at least one of the facilities and services available to the user U.

FIG. 14 illustrates an example of the facility DB 106e of the management server 10. The facility DB 106e is in which sets of the facility information, which is information related to multiple facilities in the airport A, are registered. The facilities in the airport A include, for example, lounges, duty free shops, restaurants, and the like. In addition, the facilities in the airport A include, for example, security inspection areas, departure examination areas, and the like. As illustrated in the figure, the facility information is registered for each facility ID that identifies multiple facilities in the airport A. The facility information includes, for example, the facility name, the availability conditions, the service, the location, and the like. The availability condition indicates the status of the user U who can use the facility or the service at the facility. The availability conditions may include, for example, a plurality of statuses, or only a specific single status such as the superlative status. The availability condition may indicate the seat class of the user U who can use the facility or service at the facility. The service is a service provided to the user U at the facility, and indicates, for example, the menu of food and drink to be provided, the content of available services, the content of preferential treatment, and the like. Note that the content of foods, drinks, equipment, and the like available at the facility may vary depending on the status of the user U. In this case, more foods, drinks, facilities, and the like are displayed for the user U with the higher status on the guide screen of the signage terminal 30, while fewer foods, drinks, facilities, and the like are displayed for the user U with the lower status on the guide screen of the signage terminal 30. The location is the location of the facility in the airport A. The facility information may include information other than that illustrated in FIG. 14. The facility DB 106e may have similar facility information registered for facilities outside the airport A.

In the airport A, specific facilities or services are available to the user U depending on the status of the user U. For example, some lounges operated by airline companies and the like are only available to the user U with a certain status. For example, stores such as duty-free shops and the like offer preferential services such as discount services and the like if the user U has a certain status. In addition, for example, the security inspection area may have a priority lane where the user U can receive the security inspection procedure preferentially if the user U has a certain status. In addition, for example, a priority lane is sometimes set up in the departure examination area to give priority to the departure examination procedure when the user U has a certain status. Furthermore, for example, at the boarding gate, it may be possible to board on an aircraft preferentially if the user U has a certain status. In facility DB 106e, the sets of facility information including availability conditions for facilities or services that can be used in accordance with such status are registered.

The CPU 102 can identify and extract from the facility DB 106e the facility information in the status indicated in the status information of the user U is indicated in the availability condition, and acquire the extracted one or more facility information as the availability information. Furthermore, the CPU 102 can also extract from the facility DB 106e the facility information in which the seat class included in the user information of the user U is indicated in the availability condition, and acquire the extracted one or more facility information as the available information.

Thus, the CPU 102 can identify the facilities or the services available to the user U based on the status based on the scheduled flight information ranked based on the boarding record of the user U.

Next, as illustrated in FIG. 12, the CPU 102 functions as a generation unit to generate usage guide information including the acquired available information (step S218). The use guide information is individual guide information directed to the specific user U who receives guide at the signage terminal 30, and relates to facilities or services available to the user U in the airport A according to the status, the seat class, and the like of the user U. When generating the usage guide information, the CPU 102 may include other information such as necessary time information, route information, stay availability information, necessary point information, and the like, along with the available information in the usage guide information.

The necessary time information is information that indicates necessary time from the location of the signage terminal 30, which is the current location of the user U, to the facility which is available to the user U, necessary time from the facility which is available to the user U to the boarding gate at which the user U boards, and the like. The CPU 102 can determine the necessary time by using the location of the signage terminal 30, which is the current location of the user U, the location of the facility included in the facility information, the location of the boarding gate, and the like. The CPU 102 can refer to the user DB 106a or the flight DB 106b to identify the boarding gate at which the user U boards. The CPU 102 can acquire the location of the signage terminal 30 by referring to a DB (not illustrated) in which information indicating the location of the signage terminal 30 is registered. Furthermore, the CPU 102 can acquire the location of the boarding gate by referring to a DB (not illustrated) in which information indicating the location of the boarding gate is registered.

The route information is information that indicates a route from the location of the signage terminal 30, which is the current location of the user U, to the facility which is available to the user U, a route from the facility which is available to the user U to the boarding gate at which the user U boards, the distance of each of the routes, and the like. The CPU 102 can determine the route using the location of the signage terminal 30, which is the current location of the user U, the location of the facility included in the facility information, the location of the boarding gate, and the like.

The stay availability information is information that indicates the time or duration at which the user U can stay at the facility which is available to the user U. The CPU 102 can acquire the boarding start time of the flight of the user U by referring to the flight DB 106b and acquire the possible time or duration of stay based on the boarding start time, the necessary time from the facility to the boarding gate, and the like.

The necessary point information is information that indicates the number of points required for the user U in order for the status to be set when the number of the points of the user U falls short of the standard number of points for setting the status for being able to use the facility. In addition, the necessary point information may include, as additional information, product information indicating products such as airline tickets, travel sets, and the like, which make the necessary number of points granted to the user U. The CPU 102 can acquire the number of points of the user U by referring to the member DB 106c, and acquire the number of necessary points by using the number of points of the user U and the standard number of points for setting the status.

On the other hand, when the user U in front of the signage terminal 30 is not identified as a result of the matching (step S212, NO), the CPU 102 functions as a generation unit and generates inconsistency information indicating that the user U is not identified due to the inconsistency of the matching (step S220).

Next, the CPU 102 functions as a transmission unit and transmits the usage guide information or the inconsistency information generated as described above to the signage terminal 30 via the network NW (step S222) Note that, for setting the display language in the signage terminal 30, the CPU 102 may acquire the nationality of the user U from the user DB 106a and transmit the nationality information indicating the nationality of the user U to the signage terminal 30 along with the usage guide information or the inconsistency information. The CPU 102 functions as a control unit that controls and manages the display of the signage terminal 30 by sending the usage guide information or the inconsistency information to cause the signage terminal 30 to execute the display according to the usage guide information or the inconsistency information.

Note that that the signage terminal 30 may perform the processes from step S210 to step S220 described above in place of the management server 10. In this case, the CPU 302 of the signage terminal 30 can reference the user DB 106a, the flight DB 106b, the member DB 106c and the facility DB 106e of the management server 10 through the network NW and execute the processes. The CPU 302 may perform the processes by referring to various DBs stored in its own storage device 306 in synchronization with the user DB 106a, flight DB 106b, member DB 106c and facility DB 106e.

When the CPU 302 of the signage terminal 30 receives the usage guide information from the management server 10 (step S224, YES), the CPU 302 causes the display 310 to display a guide screen for the user U based on the received usage guide information (step S226). The CPU 302 causes the display 310 to display the guide screen containing information such as the available information, the necessary time information, the route information, the stay availability information, and the necessary point information included in the usage guide information. Note that the CPU 302 may change the display language in the display 310 to a language such as the official language or the like of the country according to the nationality of the user U indicated in the nationality information received from the management server 10.

FIG. 15 illustrates the guide screen G20 displayed on the display 310. As illustrated, the guide screen G20 includes a detail area G22 displaying the details of the available facilities or services and a map area G24 displaying a premises map of the airport A.

In the detailed area G22, the CPU 302 can use the available information to display one or more detailed guides G2202 and G2204 relating to the facilities or the services available to the user U. The detailed guide G2202 displays information related to, for example, lounges, and the like, which are the facilities available to the user U. In addition, the detailed guide G2204 displays, for example, that the user U is a subject eligible for the priority security inspection who can use the priority lane where the priority security inspection procedure is performed for the user U in the security inspection area. In addition, the detailed guide G2204 indicates, for example, that the user U is a subject of the priority boarding who can board on the aircraft preferentially at the boarding gate.

The CPU 302 can display, by using the necessary time information, the necessary time from the current location of the user U to the facility and the necessary time from the facility to the boarding gate of the user U in the detailed guide G2202 related to the facilities available to the user U. In addition, the CPU 302 can display the time or duration at which the user U can stay in the facility by using the stay availability information in the detailed guide G2202 related similarly to the facility. In addition, the CPU 302 can display the available conditions such as the number of the necessary points which is the number of the points necessary for the use of the facility, the status, and the like in the detailed guide G2202 related to the facility. Note that the CPU 302 may display information related to facilities that cannot be used because the number of the points of the user U falls short of the necessary number of the points, along with the number of shortage points that fall short of the necessary number of the points, in the same manner as the available facilities.

In addition, in the detailed area G22, the CPU 302 can use the necessary point information to display the number of the points necessary for the user U to set the status that makes the facility available to the facility that the user U is unable to use. In the detailed area G22, the CPU 302 can use the additional information included in the necessary point information to display the number of the necessary points as well as information related to products such as airline tickets, travel sets, and the like which makes the number of the necessary points granted to the user U.

In addition, the CPU 302 can display a current location icon G2402 indicating the location of the signage terminal 30, which is the current location of the user U, in the map area G24. In the map area G24, the CPU 302 can display one or more location icons G2404 indicating the locations of one or more facilities available to the user U by using the facility information included in the available information. Furthermore, in the map area G24, the CPU 302 can display a route line G2406 indicating a route from the current location of the user U to the facility available to the user U by using the route information. The CPU 302 can also display the distance of the route indicated by the route line G2406 in the detail area G22 or the map area G24 by using the route information.

Note that the CPU 302 may display a location icon G2408 indicating the location of the boarding gate of the user U in the map area G24 by using the scheduled flight information of the user U included in the user information, as illustrated in FIG. 16. Furthermore, in the map area G24, the CPU 302 may display the route line G2410 indicating the route from the facility available to the user U to the boarding gate of the user U by using the route information. The CPU 302 may display the distance of the route indicated by the route line G2410 in the detail area G22 or the map area G24 by using the route information.

For example, the detailed guide G2202 is displayed in a manner that allows touch input. The user U can touch the detailed guide G2202 related to the facility or service about which the user U requests further guide to input an individual request for guide related to the facility or service into the signage terminal 30. When the individual request for guide is input, the CPU 302 causes the display 310 to display an individual guide screen related to the facility or service.

FIG. 17 illustrates an example of the individual guide screen G30 displayed on the display 310. As illustrated in the figure, the guide screen G30 is displayed when the detailed guide G2202 for a specific lounge, which is a specific facility, is touched, and includes a detailed area G32 displaying the details of the specific facility and a map area G34 displaying a premises map of the airport A.

In the detail area G32, the CPU 302 can display a menu guide G3202 indicating the menu of foods and drinks to be served in the lounge using the facility information included in the available information. In addition, in the detail area G32, the CPU 302 can display a facility guide G3204 indicating facilities such as wireless LAN, shower, and the like available in the lounge by using the facility information included in the available information. In this way, the CPU 302 can make the display 310 display the detailed contents of the facilities or the services available to the user U. The CPU 302 can change the contents of foods, drinks, equipment, and the like available in the facility to display them on the display 310 according to the status of the user U.

In the map area G34, the CPU 302 can display a location icon G3402 indicating the location of the lounge where the user U is available, using the facility information included in the available information. Furthermore, in the map area G34, the CPU 302 can display a location icon G3404 indicating the location of the boarding gate of the user U, using the scheduled flight information of the user U included in the user information. Furthermore, in the map area G34, the CPU 302 can display a route line G3406 indicating a route from the lounge to the boarding gate of the user U, using the route information. The CPU 302 can also display the distance of the route indicated by the route line G3406 using the route information in the detail area G32 or the map area G34.

Thus, the CPU 302 can make the display 310 display the guide screen for the user U based on the usage guide information. The CPU 302 can make the printer 312 print all or part of the matters displayed on the guide screen and provide the printed material to the user U.

Furthermore, the CPU 302 can cause the display 310 to display a code symbol such as a QR code (registered trademark) or the like that indicates all or part of the matters displayed on the guide screen in a readable manner. The code symbol may indicate a URL (Uniform Resource Locator) of a web page that indicates all or part of the matters displayed on the guide screen. The user U can, for example, read the code symbol by the camera 412 of the mobile terminal 40 and make the display 410 of the mobile terminal 40 display all or part of the matters displayed on the guide screen to confirm them. The CPU 302 can also audibly output the matters displayed on the guide screen, which can be audibly output, from an audio output unit such as a speaker (not illustrated) or the like.

In addition, the CPU 302 can make the printer 312 print tickets for the facility available to the user U, such as an admission ticket necessary for admission to the facility, a usage ticket certifying that the facility is available, and like, and provide the ticket to the user U.

In addition, the CPU 302 can make the printer 312 print a ticket such as a trial ticket that permits a trial use of a facility which the user U cannot use because the user U does not have a status which makes the facility available to the user U, and provide the ticket to the user U.

In addition, the CPU 302 can display a code symbol such as a QR code (registered trademark) or the like that indicates an electronic ticket that functions as a ticket such as the admission ticket, the usage ticket, the trial ticket, and the like described above, on the display 310 in a readable manner. The code symbol may indicate a URL of a web page that indicates the electronic ticket. The user U can, for example, read the code symbol by the camera 412 of the mobile terminal 40, display the electronic ticket on the display 410 of the mobile terminal 40, and use it as a ticket.

Furthermore, the user U can set the mobile terminal 40 that the user U uses to be able to communicate with the management server 10 through the network NW by an application program or the like. In this case, the CPU 102 of the management server 10 can transmit the same usage guide information as the usage guide information transmitted to the signage terminal 30 to the mobile terminal 40 via the network NW. When the mobile terminal 40 receives the usage guide information from the management server 10, the CPU 402 of the mobile terminal 40 can make the display 410 display a guide screen for the user U based on the usage guide information, as in the case of the signage terminal 30. In this case, the user U can move to the desired location to use the facilities or the services available to the user U while checking the guide screen on the mobile terminal 40 as appropriate.

In addition, the user U can register his or her own contact information such as an e-mail address in the DB of the management server 10. In this case, the CPU 102 of the management server 10 can send a guide message such as an e-mail message or the like containing the same contents as the usage guide information sent to the signage terminal 30 to the contact information such as the e-mail address of the user U. In this case, the user U can move to the target location to use the facilities or the services available to the user U while checking the guide message on the mobile terminal 40 as appropriate.

Note that the information processing system 1 can, after providing information to the user U about the facilities or the services available to the user U as described above, provide information related to the flight on which the user U is scheduled to be boarded in the same manner as the second example embodiment described below.

On the other hand, as illustrated in FIG. 12, when the CPU 302 receives the inconsistency information from the management server 10 (step S224, NO), for example, the CPU 302 causes the display 310 to display a notification prompting the user U to perform the check-in procedure (step S228). The CPU 302 can cause the display 310 to display a notification including a map indicating a place where the check-in procedure can be performed such as the check-in terminal 20, the check-in counter and the like, as the notification prompting the check-in procedure. In this case, for example, the CPU 302 can cause the display 310 to display a general usage guide related to the airport A, advertisements, and the like for the user U. The CPU 302 can also audibly output the notification, the usage guide, the advertisements, and the like as described, from an audio output unit such as a speaker (not illustrated).

As described above, in the information processing system 1 according to the present example embodiment, the signage terminal 30 guides the facilities or the services available to the user U, according to the status of the user U who is scheduled to board on the flight.

This allows the user U to accurately understand the facilities or the services available to the user U at the airport A, even if the airport A is an unfamiliar airport that the user is using for the first time.

As described above, according to the present example embodiment, the facilities or the services available to the user U who is scheduled to board on the flight can be accurately guided to the user U.

Figure 18:
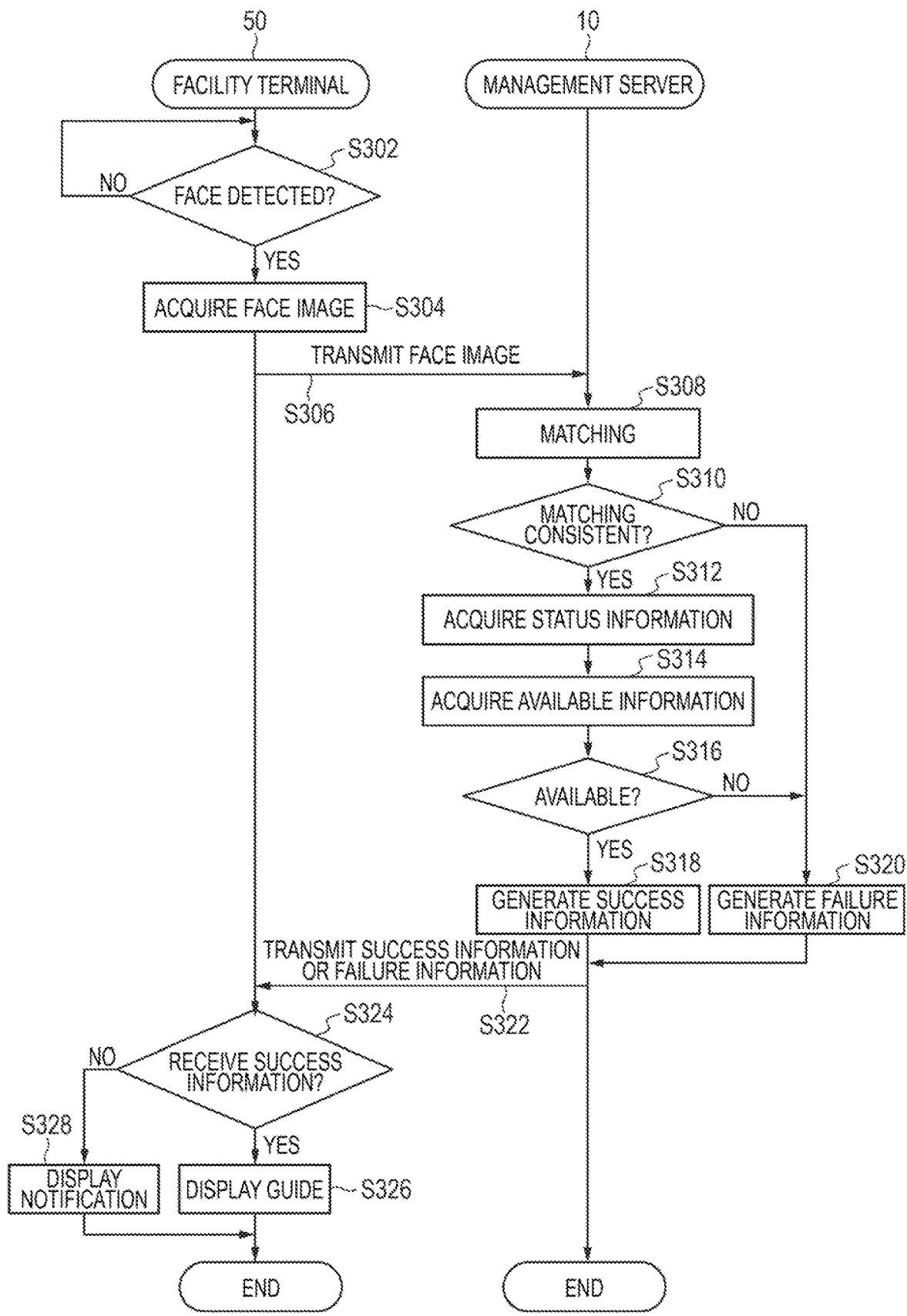
FIG. 18 is a sequence diagram illustrating the operations of the facility terminal and the management server according to the first example embodiment of the present invention.

Next, the operations of the facility terminal 50 and the management server 10 will be described with reference to FIG. 18. FIG. 18 is a sequence diagram illustrating the operations of the facility terminal 50 and the management server 10.

The user U who has been informed of the facilities available in the signage terminal 30 can visit to use the facilities indicated in the guide until boarding the aircraft. In facility F such as a lounge, which is an example of such facilities, the propriety of use is confirmed for the user U in the facility terminal 50. The facility terminal 50 is installed, for example, at the entrance, the reception or the like of facility F.

As illustrated in FIG. 18, the biometric information acquisition device 512 of the facility terminal 50 constantly or periodically captures in front of the facility terminal 50 and determines whether or not the face of the user U in front of the facility terminal 50 is detected in the captured image (step S302) The biometric information acquisition device 512 waits until the face of the user U is detected in the image (step S302, NO).

When the biometric information acquisition device 512 determines that the face of the user U is detected (step S302, YES), the biometric information acquisition device 512 captures the face of the user U and acquires a face image of the user U as a target face image (step S304).

Next, the CPU 502 of the facility terminal 50 functions as a transmission unit and transmits the target face image of the user U captured by the biometric information acquisition device 512 to the management server 10 via the network NW (step S306).

When the CPU 102 of the management server 10 receives the target face image from the facility terminal 50, the CPU 102 functions as a matching unit and performs matching of the face image of the user U (step S308). The CPU 102 performs 1:N matching of the target face image received from the facility terminal 50 and the plurality of registered face images registered in the user DB 106a. When the matching of the target face image and the passport face image is performed, the CPU 102 can match the both face images by matching the face feature amount extracted from the target face image and the face feature amount extracted from the registered face image. The CPU 102 functions as a determination unit and can determine that the matching of the two face images is consistent when, for example, the similarity of the two face images shows a high similarity equal to or greater than a standard. When a registered face image which is consistent with the target face image is found by the matching, the user U in front of the facility terminal 50 is identified.

Note that the CPU 502 of the facility terminal 50 can be configured to stream the video before the facility terminal 50 to the management server 10. In this case, instead of receiving the target face image from the facility terminal 50, the CPU 102 of the management server 10 can detect and acquire the target face image of the user U from the video streamed from the facility terminal 50.

When the user U in front of the facility terminal 50 is identified as a result of the matching (step S310, YES), the CPU 102 functions as an acquisition unit to acquire the status information of the user U from the user DB 106a (step S312). Referring to the user DB 106a, the CPU 102 acquires the status information associated with the registered face image which is consistent with the target face image as the status information of the user U. The CPU 102 can also acquire the seat class included in the scheduled flight information associated with the registered face image which is consistent with the target face image along with the status information.

Next, the CPU 102 functions as an acquisition unit and acquires the availability condition of the facility F where the facility terminal 50 is installed by referring to the facility DB 106e (step S314).

Next, the CPU 102 functions as a determination part and compares the status indicated in the status information of the user U with the availability condition of the facility F to determine whether or not the user U can use the facility F (step S316). The CPU 102 can also compare the seat class of the user U with the availability condition of the facility F to determine whether or not the user U can use the facility F. The CPU 102 determines that facility F is available to user U when the status or the seat class of user U is included in the availability condition of facility F. On the other hand, if the status or the seat class of the user U is not included in the availability condition of the facility F, the CPU 102 determines that the user U is not able to use the facility F.

When the CPU 102 determines that facility F is available to the user U (step S316, YES), the CPU 102 functions as a generation unit and generates success information (step S318). The success information is information that indicates that it is successful to confirm that the facility F is available to the user U.

On the other hand, when the user U in front of the facility terminal 50 is not identified as a result of the matching (step S310, NO), the CPU 102 functions as a generation unit and generates failure information (step S320). The failure information is information that indicates that it is failed to confirm that the facility F is available to the user U.

Even if the user U in front of the facility terminal 50 is identified (step S310, YES), when the CPU 102 determines that the user U cannot use the facility F (step S316, NO), the CPU 102 similarly generates the failure information (step S320).

Next, the CPU 102 functions as a transmission unit and transmits the success information or the failure information generated as described above to the facility terminal 50 via the network NW (step S322).

Note that the facility terminal 50 may perform the processes from step S308 to step S320 described above in place of the management server 10. In this case, the CPU 502 of the facility terminal 50 can reference the user DB 106a and the facility DB 106e of the management server 10 through the network NW and execute the processes. The CPU 502 may perform the processes by referring to various DBs stored in its own storage device 306 in synchronization with the user DB 106a and the facility DB 106e.

When the CPU 502 of the facility terminal 50 receives the success information from the management server 10 (step S324, YES), for example, the CPU 502 causes the display 510 to display a guide screen to guide the user U to enter the facility F (step S326). The CPU 502 can also guide the user U to enter the facility F by, for example, executing a process such as audio output from an audio output unit such as a speaker (not illustrated), opening a door or a gate installed at the entrance of the facility F, or the like. In this case, for example, the CPU 502 opens a closed door or a closed gate installed at the entrance of facility F.

On the other hand, when the CPU 502 receives the failure information from the management server 10 (step S324, NO), the CPU 502 causes the display 510 to display a notification to the user U requesting confirmation of the condition for using the facility F such as confirmation of the status or the like, for example (step S328). In this case, for example, the CPU 502 maintains the closed state without opening the closed door or the closed gate installed at the entrance of the facility F. In this case, the CPU 502 can also display on the display 510, for example, a guide of alternative means for using facility F such as presentation of a boarding ticket for a seat class of a specific grade or higher, payment of a usage fee and the like, advertisements, and the like. The CPU 502 can also audibly output the notification, the guide of alternative means, the advertisements, and the like as described, from an audio output unit such as a speaker (not illustrated).

Thus, in the information processing system 1 according to the present example embodiment, in facility F which is a facility available to the user U, it is determined whether or not the user U can use facility F through identification of the user U by the matching of the face image which is biometric information. Therefore, according to the present example embodiment, it is possible to easily determine whether or not the facility F is available to the user U without any manual labor.

Second Example Embodiment

An information processing system, information processing apparatuses and an information processing method according to a second example embodiment of the present invention will be described with reference to FIG. 19 to FIG. 25. Note that the same components as those in the information processing system, the information processing apparatuses, and the information processing method according to the first example embodiment described above are labeled with the same references, and the description thereof will be omitted or simplified.

The configuration of the information processing system 1 according to the present example embodiment is the same as described in the first example embodiment. In the signage terminal 30, the user U can receive the guide related to the facilities or the services available to the user U as described in the first example embodiment. In addition, the user U receives the guide related to the flight of the aircraft on which the user U is scheduled to board. In the present example embodiment, a case in which the user U receives the guide related to the flight of the aircraft on which the user U is scheduled to board. The guide related to the flight includes a guide related to actions to be taken by the user U in connection with the flight.

Figure 19:
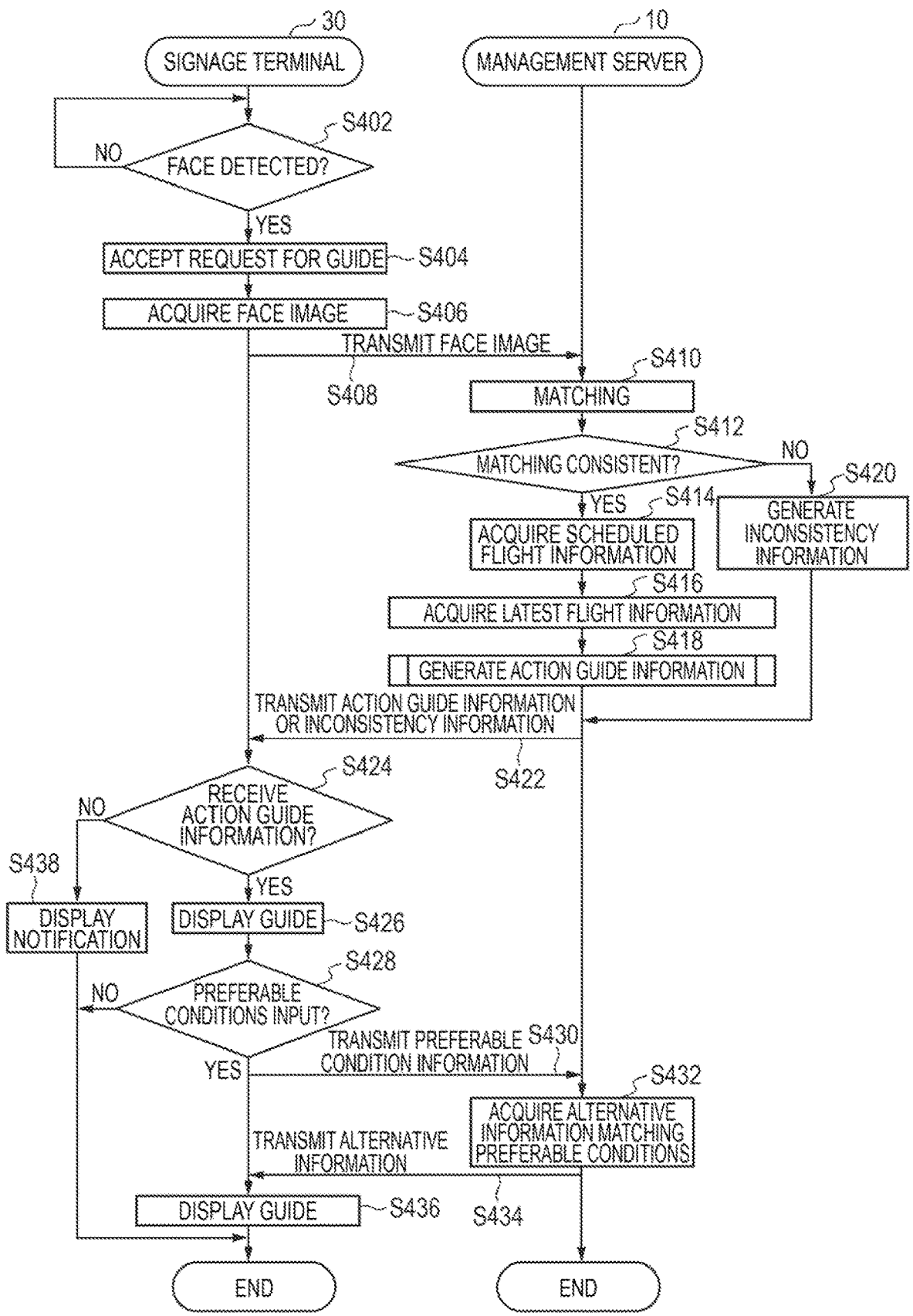
FIG. 19 is a sequence diagram illustrating the operations of the signage terminal and the management server in the information processing system according to a second example embodiment of the present invention.
Figure 20:
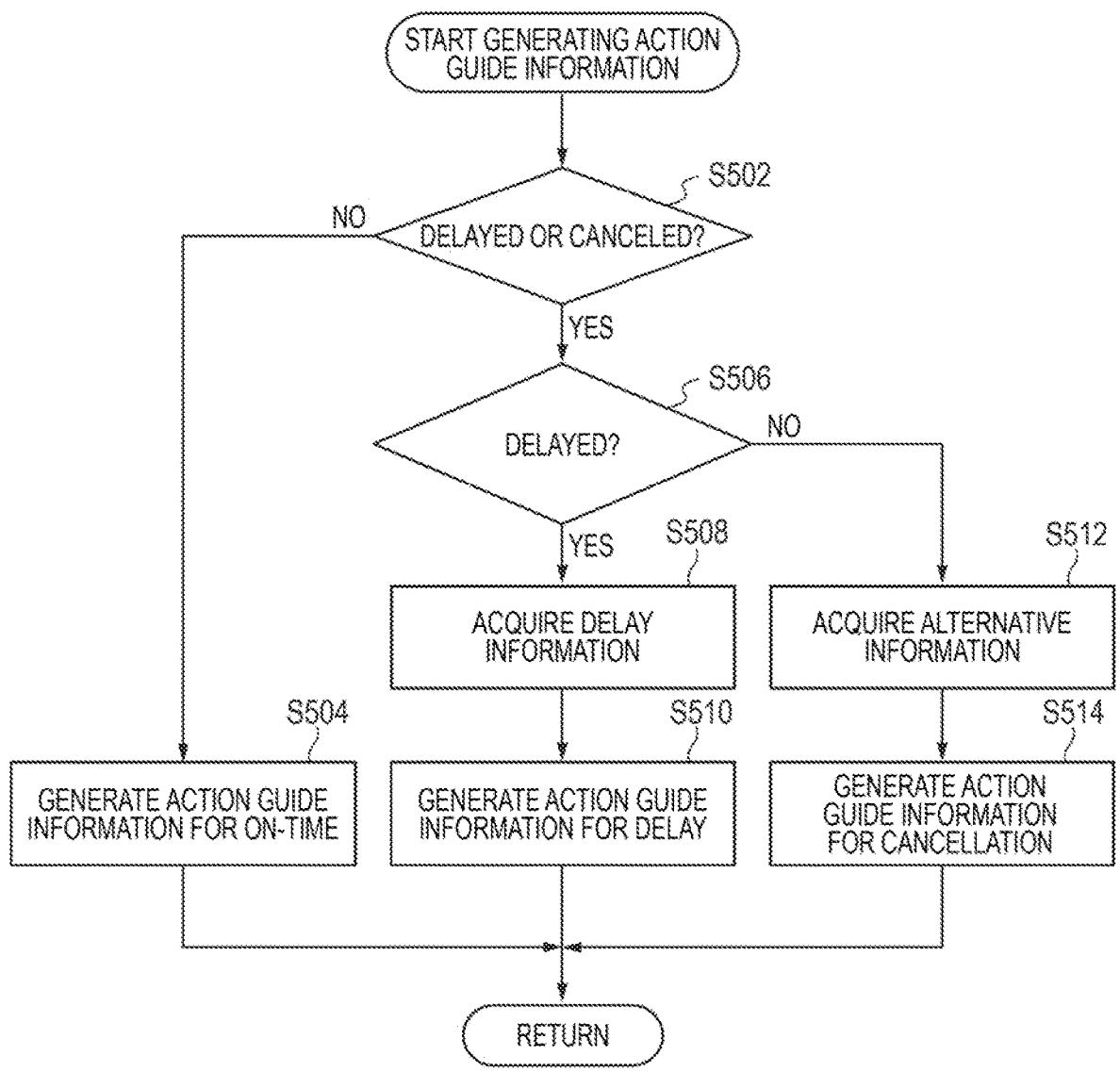
FIG. 20 is a flow chart illustrating the operations of the management server according to the second example embodiment of the present invention.

Hereafter, the operations of the signage terminal 30 and the management server 10 when the user U receives the guide related to the flight of the aircraft on which the user U is scheduled to board will be described with reference to FIG. 19 to FIG. 25. FIG. 19 is a sequence diagram illustrating the operations of the signage terminal 30 and the management server 10. FIG. 20 is a flow chart illustrating the operation of the management server 10 when generating action guide information. FIG. 21 to FIG. 25 are schematic diagrams illustrating examples of guide screens displayed in the signage terminal 30, respectively.

The user U who has completed the check-in procedure at the check-in terminal 20 in the same manner as in the first example embodiment conducts a baggage check-in procedure at the baggage counter as necessary, and then proceeds to the boarding gate after undergoing the security inspection at the security inspection are and the departure examination at the departure examination area. Until boarding the aircraft at the boarding gate, which is the boarding area for the aircraft, the user U can receive the guide related to the facilities or the services available to the user U in the same manner as in the first example embodiment through the signage terminal 30, the guide related to the flight on which the user U is scheduled to board, and the like. The guide related to the flight includes a guide related to actions to be taken by the user U in connection with the flight.

As illustrated in FIG. 19, the biometric information acquisition device 314 of the signage terminal 30 constantly or periodically captures in front of the signage terminal 30 and determines whether or not the face of the user U in front of the signage terminal 30 is detected in the captured image (step S402). The biometric information acquisition device 314 waits until the face of the user U is detected in the image (step S402, NO).

When the CPU 302 of the signage terminal 30 determines that the biometric information acquisition device 314 has detected the face of the user U in the image (step S402, YES), the CPU 302 makes the display 310 display a reception screen for accepting an input of request for guide from the user U (step S404). Thus, the CPU 302 receives the input of request for guide from the user U.

As described in the first example embodiment, the CPU 302 receives the input of request for guide from the user U by displaying, for example, the reception screen G10 illustrated in FIG. 13 on the display 310. The following is a description of a case in which, in the present example embodiment, a request for the guide related to the flight on which the user U is scheduled to board is input by the user U in the signage terminal 30, and the user U receives the guide related to the flight on which the user U is scheduled to board.

As illustrated in FIG. 19, when the user U inputs a request for guide regarding the flight on which the user U is scheduled to board, the biometric information acquisition device 314 captures the face of the user U and acquires a face image of the user U as a target face image (step S406).

Note that the signage terminal 30 can skip the process of accepting the request for guide in step S404 and move to step S406 of acquiring the target face image. In this case, when the biometric information acquisition device determines that the face of the user U in front of the signage terminal 30 is detected in the captured image, the biometric information acquisition device 314 can capture the face of the user U and acquire a face image of the user U as the target face image.

Next, the CPU 302 functions as a transmission unit and transmits the target face image of the user U captured by the biometric information acquisition device 314 to the management server 10 via the network NW (step S408).

When the CPU 102 of the management server 10 receives the target face image from the signage terminal 30, the CPU 102 functions as a matching unit and performs matching of the face image of the user U (step S410). The CPU 102 performs 1:N matching of the target face image received from the signage terminal 30 and the plurality of registered face images registered in the user DB 106a. When the matching of the target face image and the passport face image is performed, the CPU 102 can match the both face images by matching the face feature amount extracted from the target face image and the face feature amount extracted from the registered face image. The CPU 102 functions as a determination unit and can determine that the matching of the two face images consistent when, for example, the similarity of the two face images shows a high similarity equal to or greater than a standard. When a registered face image which is consistent with the target face image is found by the matching, the user U in front of the signage terminal 30 is identified.

Note that the CPU 302 of the signage terminal 30 can be configured to stream the video in front of the signage terminal 30 to the management server 10. In this case, instead of receiving the target face image from the signage terminal 30, the CPU 102 of the management server 10 can detect and acquire the target face image of the user U from the video streamed from the signage terminal 30.

When the user U in front of the signage terminal 30 is identified as a result of the matching (step S412, YES), the CPU 102 functions as an acquisition unit to acquire the scheduled flight information of the user U from the user DB 106a (step S414). Note that it is not necessary for the CPU 102 to acquire all the information included in the scheduled flight information, but the CPU 102 can acquire information such as the flight number or the like that enables the user U to identify the flight on which the user U is scheduled to board.

Next, the CPU 102 functions as an acquisition unit and acquires the latest flight information of the flight identified by the scheduled flight information of the user U from the flight DB 106b (step S416).

Next, the CPU 102 functions as a generation unit and generates action guide information based on the acquired latest flight information (step S418). The action guide information is individual guide information that indicates actions which the user U should take depending on the flight status.

As illustrated in FIG. 20, when generating the action guide information, the CPU 102 determines whether or not the flight on which the user U is scheduled to board has been delayed or canceled, based on the flight status included in the latest flight information (step S502). The flight status indicates whether the flight is on time, delayed or canceled, and in the case of delay and cancellation, the cause of bad weather, equipment trouble, or the like, and the delay time in the case of delay.

Thus, based on the scheduled flight information, which is boarding information, the CPU 102 acquires the latest flight information of the flight on which the user U is scheduled to board and identifies the operating status of the flight.

When the CPU 102 determines that the flight on which the user U is scheduled to board has not been delayed or canceled, that is, is on time (step S502, NO), the CPU 102 generates the action guide information for on-time based on the latest flight information (step S504). The action guide information for on-time includes information such as the flight status indicating the scheduled flight of the user U is on time, the boarding gate at which the user U should proceed, the final time to proceed to the boarding gate, and the like. The action guide information for on-time also includes the latest flight information of the flight on which the user U is scheduled to board.

When the CPU 102 determines that the flight on which the user U is scheduled to board has been delayed or canceled (step S502, YES), the CPU 102 further determines whether the flight on which the user U is scheduled to board has been delayed or not based on the flight status included in the latest flight information (step S506). Note that, if the flight is significantly delayed for a delay time equal to or more than a prescribed time, the CPU 102 can also treat the significant delay as equivalent to the cancellation of the flight by executing the same processing as the case where the flight is canceled described later.

When the CPU 102 determines that the flight on which the user U is scheduled to board is delayed (step S506, YES), the CPU 102 acquires delay information (step S508). The delay information is information that indicates the delay time of the flight on which the user U is scheduled to board. The CPU 102 can acquire the delay information from the latest flight information of the flight of the user U.

Next, the CPU 102 generates the action guide information for delay (step S510). The action guide information for delay includes delay information as well as information including the flight status indicating that the flight on which the user U is scheduled to board is delayed, the boarding gate at which the user U should proceed, the final time to proceed to the boarding gate, and the like. In addition, the action guide information for delay includes the latest flight information of the flight on which the user U is scheduled to board.

On the other hand, when the CPU 102 determines that the flight on which the user U is scheduled to board has been canceled (step S506, NO), the CPU 102 acquires alternative information (step S512). The alternative information is information related to a subsequent flight that may arrive at the destination on behalf of the canceled flight of the user U and the like, including the latest flight information for one or more alternative flights, and information including guide related to the need for booking or check-in procedures for alternative flights, and the like. The CPU 102 can acquire the alternative information by referencing the flight DB 106b. The CPU 102 can also acquire the alternative information from the server of the airline company. The CPU 102 can, for example, select one or more alternative flights among the subsequent flights whose departure time is within a predetermined time from the scheduled departure time of the canceled flight to acquire the alternative information.

Note that the CPU 102 can also acquire, as the alternative information, information on the operation of transportations other than aircrafts such as buses, trains, and the like that may be substituted for the flight on which the user U is scheduled to board, along with or instead of the information on the alternative flight. In this case, the CPU 102 can acquire information related to the operation of other transportations from, for example, an external server that manages the operation of other transportations.

Next, the CPU 102 generates the action guide information for cancellation (step S514). The action guide information for cancellation includes the alternative information as well as information including flight status indicating that the flight on which the user U is scheduled to board has been canceled. In addition, the action guide information for cancellation includes information on where to pick up baggage deposited through the baggage check-in procedure for the canceled flight, where to book an alternative flight, and information on fare refunds for the canceled flight. The CPU 102 can acquire information such as the baggage pickup location, the reservation location for an alternative flight, the fare refund guide, and the like from the server of the airline company. In addition, the action guide information for cancellation includes the latest flight information of the flight on which the user U is scheduled to board.

In this way, the CPU 102 generates the action guide information for on-time, delay or cancellation according to the flight status of the flight on which the user U is scheduled to board.

On the other hand, as illustrated in FIG. 19, when the user U in front of the signage terminal 30 is not identified as a result of the matching (step S412, NO), the CPU 102 generates inconsistency information indicating that the user U is not identified due to the inconsistency of the matching (step S420).

Next, the CPU 102 functions as a transmission unit and transmits the action guide information for on-time, delay or cancellation, or the inconsistency information generated as described above to the signage terminal 30 via the network NW (step S422). In addition, note that, for setting the display language in the signage terminal 30, the CPU 102 may acquire the nationality of the user U from the user DB 106a and transmit the nationality information indicating the nationality of the user U to the signage terminal 30 along with the usage guide information or the inconsistency information. The CPU 102 functions as a control unit that controls and manages the display of the signage terminal 30 by sending the action guide information or the inconsistency information to cause the signage terminal 30 to execute the display according to the action guide information or the inconsistency information.

Note that the signage terminal 30 may perform the processes from step S410 to step S420 described above in place of the management server 10. In this case, the CPU 302 of the signage terminal 30 can reference the user DB 106a and the flight DB 106b of the management server 10 through the network NW and execute the processes. The CPU 302 may perform processes by referring to the DB stored in its own storage device 306 in synchronization with the user DB 106a and the flight DB 106b.

When the CPU 302 of the signage terminal 30 receives the action guide information from the management server 10 (step S424, YES), the CPU 302 causes the display 310 to display a guide screen for the user U based on the received action guide information (step S426). The CPU 302 causes the display 310 to display a guide screen corresponding to the action guide information for on-time, delay or cancellation as follows. Note that the CPU 302 may change the display language in the display 310 to a language such as the official language or the like of the country according to the nationality of the user U indicated in the nationality information received from the management server 10.

When the CPU 302 receives the action guide information for on-time, the CPU 302 causes the display 310 to display a guide screen for on-time based on the received action guide information for on-time. In this case, the CPU 302 causes the display 310 to display the guide screen for on-time including the content of information included in the action guide information for on-time. The guide screen for on-time includes the latest information on the flight on which the user U is scheduled to board, the flight status indicating that the flight is on time, the boarding gate at which the user U should proceed, and the final time to proceed to the boarding gate included in the action guide information for on-time. The CPU 302 can guide the actions to be taken by the user U when the flight on which the user U is scheduled to board is on time by displaying the guide screen for on-time.

Figure 21:
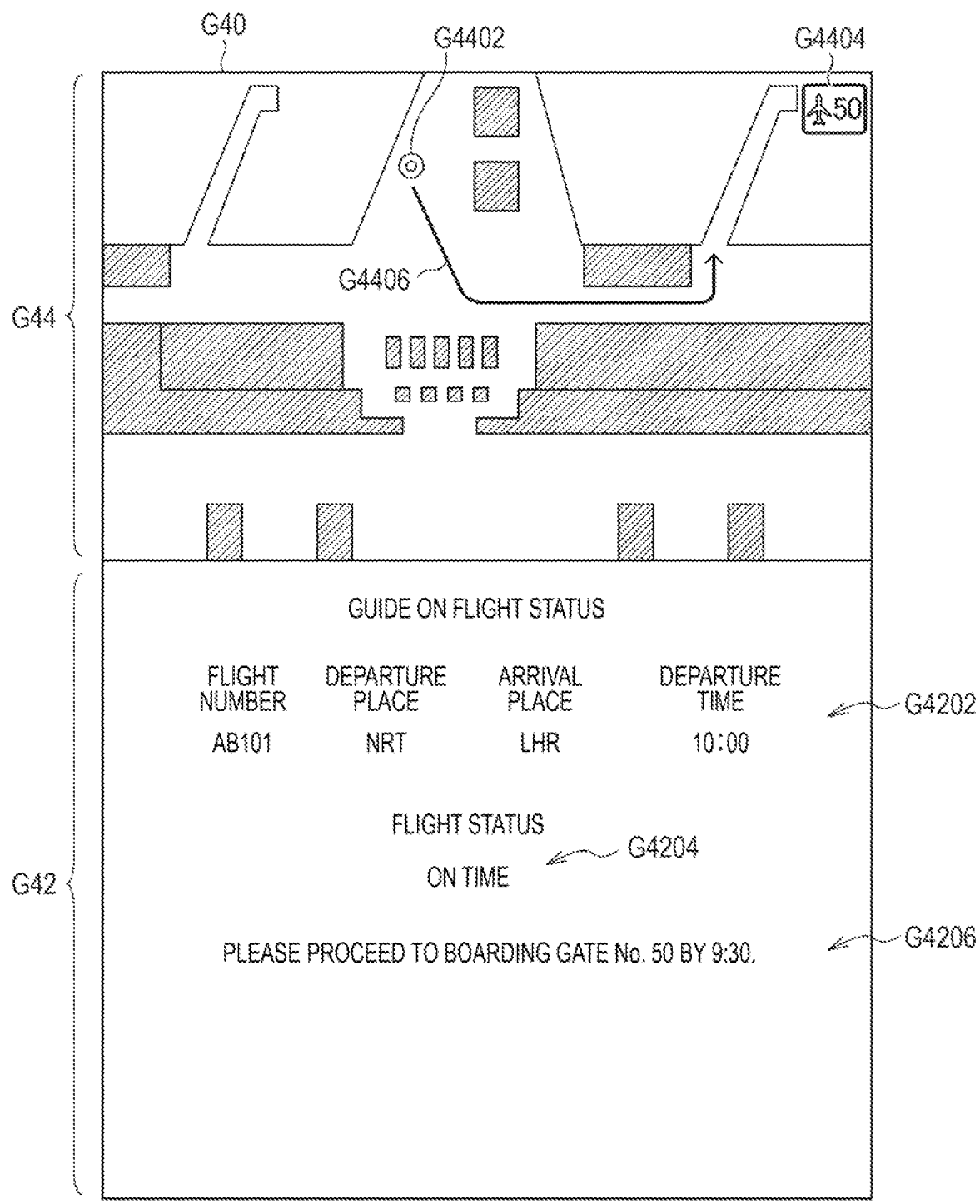
FIG. 21 is a schematic diagram illustrating an example of a guide screen displayed in the signage terminal according to the second example embodiment of the present invention.

FIG. 21 illustrates the guide screen G40 for on-time displayed on the display 310. As illustrated in the figure, the guide screen G40 for on-time includes a detail area G42 for displaying the details of the flight on which the user U is scheduled to board and the action guide, and a map area G44 for displaying a premises map of the airport A.

In the detail area G42, the CPU 302 can display the latest information G4202 of the flight on which the user U is scheduled to board, using the latest information of the flight on which the user U is scheduled to board, which is included in the action guide information for on-time. In addition, the CPU 302 can display in the detail area G42 the flight status G4204 indicating that the flight on which the user U is scheduled to board is on time, using the flight status included in the action guide information for on-time. In addition, the CPU 302 can display, by using the boarding gate to which the user U should proceed and the final time to proceed to the boarding gate included in the action guide information for on-time, the action guide G4206 indicating the boarding gate and the final time in the detail area G42. In this case, the CPU 302 can also display the remaining time up to the final time visually and clearly by, for example, a progress bar whose length changes according to the remaining time up to the final time.

In addition, the CPU 302 can display a current location icon G4402 indicating the location of the signage terminal 30, which is the current location of the user U, in the map area G44. In addition, the CPU 302 can display a location icon G4404 indicating the location of the boarding gate where the user U should proceed in the map area G44. Furthermore, in the map area G44, the CPU 302 can display a route line G4406 indicating a route from the current location of the user U to the boarding gate where the user U should proceed. The CPU 302 can also display the travel time and the distance of the route indicated by the route line G4406 in the detail area G42 or the map area G44.

When the CPU 302 receives the action guide information for delay, the CPU 302 causes the display 310 to display a guide screen for delay based on the received action guide information for delay. In this case, the CPU 302 causes the display 310 to display the guide screen for delay including the content of the information included in the action guide information for delay. The guide screen for delay includes the latest information on the flight on which the user U is scheduled to board, the flight status indicating that the flight is delayed, the delay information, the boarding gate at which the user U should proceed, the final time to proceed to the boarding gate, and the like, which is included in the action information for delay. The CPU 302 can guide the actions to be taken by the user U when the flight on which the user U is scheduled to board is delayed by displaying the guide screen for the delay.

Figure 22:
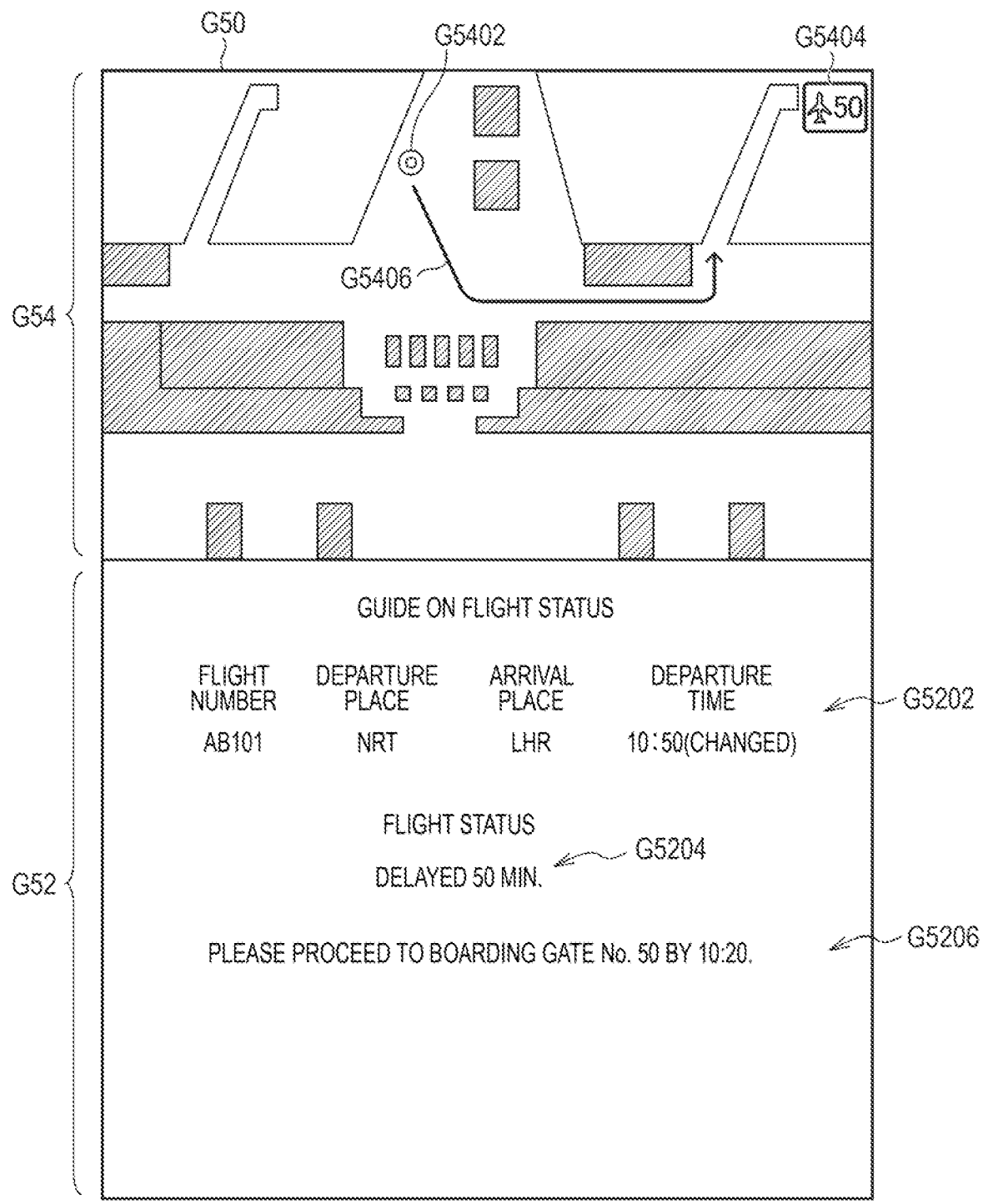
FIG. 22 is a schematic diagram illustrating an example of a guide screen displayed in the signage terminal according to the second example embodiment of the present invention.

FIG. 22 illustrates the guide screen G50 for delay displayed on the display 310. As illustrated in the figure, the guide screen G50 for delay includes a detail area G52 for displaying the details of flight on which the user U is scheduled to board and the action guide, and a map area G54 for displaying a premises map of the airport A.

In the detail area G52, the CPU 302 can display the latest information G5202 of the flight on which the user U is scheduled to board, using the latest information of the flight on which the user U is scheduled to board, which is included in the action guide information for delay. In addition, the CPU 302 can display in the detail area G52 the flight status G5204 indicating that the flight on which the user U is scheduled to board is delayed, using the flight status included in the action guide information for delay. The CPU 302 can change the expression method of color, font, size, shape, and the like, with respect to the flight status G4204 for on-time to highlight the flight status G5204 for delay. The CPU 302 can also display the delay time when the flight is delayed using the delay information in the flight status G5204. The CPU 302 can also display the waiting time until boarding based on the delay time in the flight status G5204. The CPU 302 can display the waiting time that matches the delay time, or the waiting time that includes the delay time plus a margin. In addition, the CPU 302 can display in the detail area G52 the action guide G5206 indicating the boarding gate and the final time by using the boarding gate to which the user U should proceed and the final time to proceed to the boarding gate included in the action guide information for delay. In this case, the CPU 302 can also display the remaining time up to the final time visually and clearly by, for example, a progress bar whose length changes according to the remaining time up to the final time.

In addition, the CPU 302 can display a current location icon G5402 indicating the location of the signage terminal 30, which is the current location of the user U, in the map area G54. In addition, the CPU 302 can display a location icon G5404 indicating the location of the boarding gate where the user U should proceed in the map area G54. Furthermore, in the map area G54, the CPU 302 can display a route line G5406 indicating a route from the current location of the user U to the boarding gate where the user U should proceed. The CPU 302 can also display the travel time and the distance of the route indicated by the route line G5406 in the detail area G52 or the map area G54.

Figure 23:
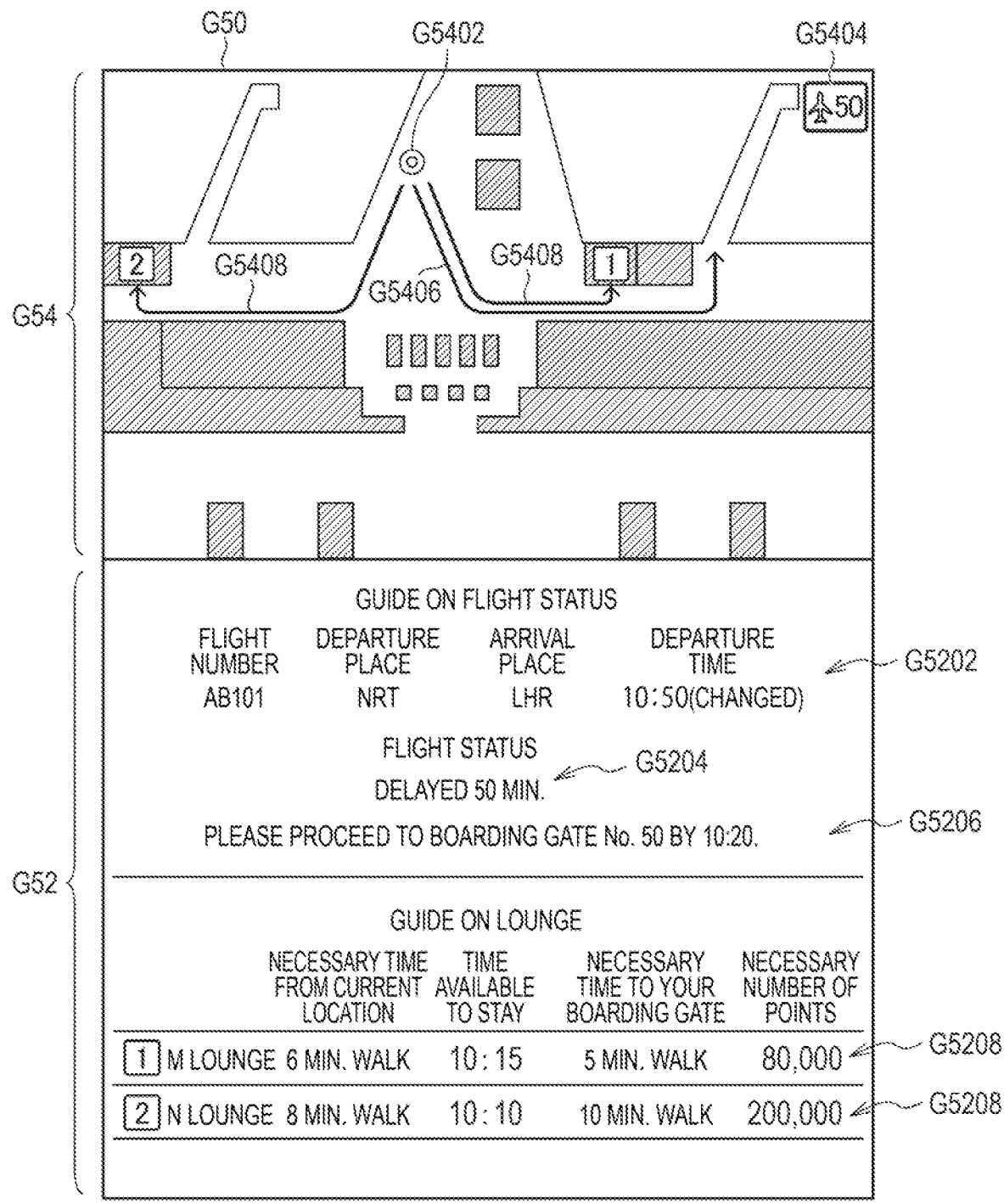
FIG. 23 is a schematic diagram illustrating an example of a guide screen displayed in the signage terminal according to the second example embodiment of the present invention.

In addition, the CPU 302 can guide facilities such as lounges by displaying information related to facilities such as lounges where the user U spends time waiting for boarding on the guide screen G50 for delay. In this case, in addition to the guide illustrated in FIG. 22, the CPU 302 can display one or more detailed guide G5208 relating to facilities such as lounges where the user U can spend the waiting time in the detailed area G52 as illustrated in FIG. 23. The CPU 302 can display detailed guide G5208 about facilities available to the user U according to the status or the like of the user U, in the same manner as the first example embodiment. The content of foods, drinks, equipment, etc. available at the facility may vary depending on the status of the user U. In this case, the more foods, drinks, equipment, and the like are displayed for the user U with the higher status in the detailed guide G5208, while the fewer foods, drinks, equipment, and the like are displayed for the user U with the lower status in detailed guide G5208. In addition, the CPU 302 can also display detailed guide G5208 about a facility such as a prescribed lounge for the user U whose scheduled flight has been identified as delayed by the matching of the face information, as the facility is available to the user U regardless of his or her status.

The CPU 302 can display in the detailed guide G5208 the necessary time from the current location of the user U to the facility and the necessary time from the facility to the boarding gate of the user U in the same manner as the first example embodiment. In addition, the CPU 302 can display the time or duration at which the user U can stay in the facility on the basis of the delay time in the detailed guide G5208. In addition, the CPU 302 can display the available conditions such as the number of the necessary points which is the number of the points necessary for use of the facility, the status and the like in the detailed guide G5208 related to the facility. In addition, the CPU 302 can display, in the map area G54, a route line G5408 indicating a route from the current location of the user U to the facility which is guided in the detailed guide G5208. The CPU 302 can also display the travel time and the distance of the route indicated by the route line G5408 in the detail area G52 or the map area G54. Note that the CPU 302 can also display information related to facilities such as lounges where the user U spends the time to wait for boarding on the guide screen G40 for on-time and guide facilities such as lounges and the like.

In addition, when the CPU 302 receives the action guide information for cancellation, the CPU causes the display 310 to display a guide screen for cancellation based on the received action guide information for cancellation. In this case, the CPU 302 causes the display 310 to display the guide screen for the cancellation including the contents of the information included in the action guide information for the cancellation. The guide screen for cancellation includes the latest information on the flight on which the user U is scheduled to board, the flight status indicating that the flight is canceled, and the alternative information included in the action information for cancellation. In addition, the guide screen for cancellation includes guides related to where to pick up baggage deposited under the baggage check-in procedure for the canceled flight and the fare refunds for the canceled flight, and the like. The CPU 302 can guide the actions to be taken by the user U when the flight on which the user U is scheduled to board is canceled by displaying a guide screen for cancellation.

Figure 24:
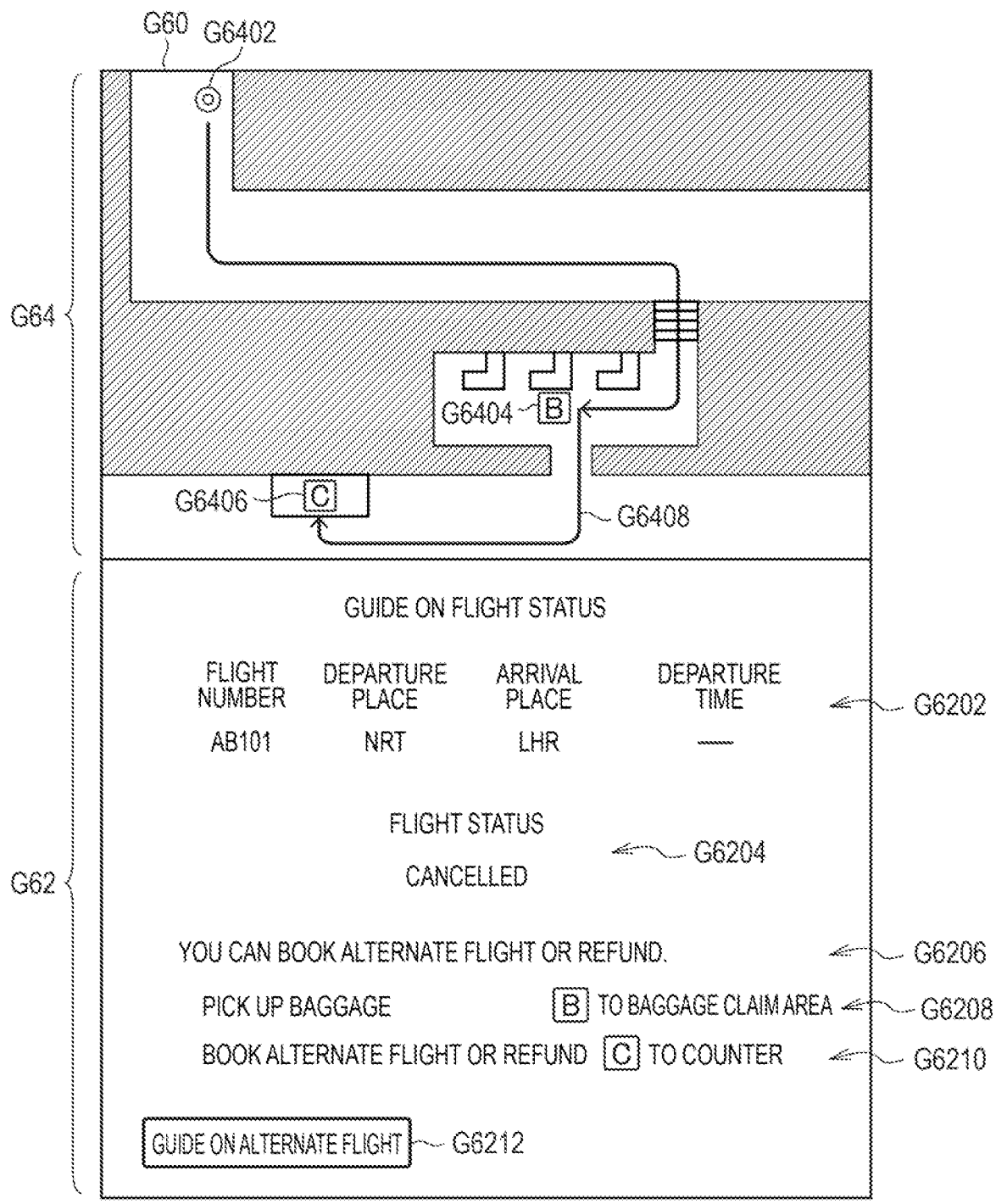
FIG. 24 is a schematic diagram illustrating an example of a guide screen displayed in the signage terminal according to the second example embodiment of the present invention.

FIG. 24 illustrates an example of the guide screen G60 for cancellation displayed on the display 310. As illustrated in the figure, the guide screen G60 for cancellation includes a detail area G62 for displaying the details of the flight on which the user U is scheduled to board and the action guide, and a map area G64 for displaying a premises map of the airport A.

In the detail area G62, the CPU 302 can display the latest information G6202 of the flight on which the user U is scheduled to board, using the latest information of the flight on which the user U is scheduled to board, which is included in the action guide information for cancellation. In addition, the CPU 302 can display in the detail area G62 the flight status G6204 indicating that the flight on which the user U is scheduled to board is canceled, using the flight status included in the action guide information for cancellation. The CPU 302 can further emphasize the flight status G6204 at the time of cancellation by changing the expression method of color, font, size, shape, and the like, with respect to the flight status G4204 and G5204 at the time of on-time and delay. In addition, the CPU 302 can display in the detail area G62 an action guide G6206 indicating that it is possible to book an alternative flight (substitute flight) which is an alternate flight or refund the fare.

The CPU 302 can display together with the action guide G6206 a location guide G6208 that identifies the baggage claim area that is the location for the baggage claim using the location for the baggage claim in which the baggage deposited in the baggage check-in procedure related to the canceled flight is picked up included in the action guide information for cancellation. In addition, the CPU 302 can display together with the action guide G6206 the location guide G6210 identifying the counter using the guides related to the location of the reservation of the alternative flight and the refund of the fare for the canceled flight included in the action guide information for the cancellation. The counters identified by the location guide G6210 allow for procedures such as booking an alternative flight and refunding the fare for the canceled flight.

In addition, the CPU 302 can cause a button G6212 for accepting an input for request of displaying information related to an alternative flight, which is an alternate flight, to be displayed so as to be able to be input by touch in the detail area G62. The user U can touch the button G6212 and input his or her request to display the information related to the alternative flight into the signage terminal 30. The CPU 302 can also display the information related to the alternative flight in the detail area G62.

In addition, the CPU 302 can display a current location icon G6402 indicating the location of the signage terminal 30, which is the current location of the user U, in the map area G64. In addition, the CPU 302 can display a location icon G6404 indicating the location of the baggage claim area identified by the location guide G6208 in the map area G64. The CPU 302 can display a location icon G6406 indicating the location of the counter identified by the location guide G6210 in the map area G64. Furthermore, in the map area G64, the CPU 302 can display a route line G6408 indicating a route from the current location of the user U to the baggage claim area and to the counter.

When the button G6212 displayed in the detail area G62 is touched by the user U, the CPU 302 can use the alternative information to display information related to one or more alternative flights on the display 310. Note that the CPU 302 may display the information related to the alternative flights on the guide screen G60 without displaying the button G6212.

FIG. 25 illustrates a guide screen G70 for alternative flight displayed on display 310. As illustrated in the figure, the guide screen G70 includes an alternative flight display area G72 that displays information related to alternative flights. In addition, the guide screen G70 includes a preferable condition input area G74 for the user U to input preferable conditions for the alternative flight and an accommodation display area G76 for displaying information related to the accommodation for the user U who is to be rescheduled to a flight at a later date.

The CPU 302 can display information related to one or more alternative flights using the alternative information in the alternative flight display area G72. The CPU 302 can display the departure date, the departure time, the arrival time, and the like, including information such as whether the flight is the same day, tomorrow or later, and the like, as the information related to the alternative flight.

In addition, the CPU 302 can accept inputs of the preferable conditions of the user U regarding the alternative flight. In this case, the CPU 302 can selectively display condition specification fields G7402, G7404, G7406 and G7408 for specifying and inputting various preferable conditions in the preferable condition input area G74. The condition specification field G7402 accepts, for example, a specification of a request for the earliest possible arrival. The condition specification field G7404 accepts, for example, a specification of request that excludes nighttime arrivals. The condition specification field G7406 accepts, for example, a specification of a time zone for the preferable departure time by input or selection. The condition specification field G7408 accepts, for example, a specification of a time zone for the preferable arrival time by input or selection. The user U can select the condition specification fields G7402, G7404, G7406 and G7408 as appropriate and input the preferable conditions for the alternative flight into the signage terminal 30. With this, the user U can easily find an alternative flight that matches his or her preference.

Note that the CPU 302 may accept input of multiple set of the preferable conditions as the preferable conditions of the user U regarding the alternative flight. In this case, the CPU 302 can accept the input of the multiple set of the preferable conditions so that the user U can set priorities for the multiple set of the preferable conditions. When the multiple set of the preferable conditions are entered together with the priorities, the CPU 102 can more preferentially display information related to alternative flights matching the preferable conditions with higher priority on the guide screen.

As illustrated in FIG. 19, when the guide screen for the cancellation is displayed in step S426 and the user U does not input the preferable conditions for the alternative flight (step S428, NO), the CPU 302 terminates the processing. In addition, the CPU 302 similarly terminates the processing after displaying the guide screen for on-time or delay time in step S426.

On the other hand, when the user U inputs the preferable conditions regarding an alternative flight (step S428, YES), the CPU 302 functions as a transmission unit and transmits the preferable condition information indicating the input preferable conditions to the management server 10 via the network NW (step S430).

When the CPU 102 of the management server 10 receives the preferable condition information from the signage terminal 30, the CPU 102 functions as an acquisition unit and acquires the alternative information related to one or more alternative flights that matches the preferable conditions indicated by the received preferable conditions information (step S432). The CPU 102 can refer to the flight DB 106b to acquire the alternative information matching the preferable conditions. In addition, the CPU 102 can acquire the alternative information matching the preferable conditions from the server of the airline company. In addition, when the alternative information includes information related to the alternative flight of the later flight, the CPU 102 can refer to the facility DB 106e, the accommodation DB not illustrated, and the like, and acquire the accommodation information related to the accommodation facility where the user U who is scheduled to board on the later flight can stay.

Next, the CPU 102 functions as a transmission unit and transmits the alternative information matching the preferable conditions to the signage terminal 30 via the network NW (step S434). The CPU 102 can also transmit the accommodation information to the signage terminal 30 along with the alternative information when the CPU 102 has acquired the accommodation information.

When the CPU 302 of the signage terminal 30 receives the alternative information matching the preferable conditions from the management server 10, the CPU 302 uses the received alternative information to make the display 310 display a guide including information related to the alternative flight matching the preferable conditions (step S436). In addition, when the CPU 302 receives the accommodation information along with the alternative information, the CPU 302 makes the display 310 display a guide including information related to the accommodation indicated in the accommodation information. The information related to the alternative flight as well as the information related to the accommodation are guided so that the user U can use a flight at a later date as the alternative flight with peace of mind.

In the case of the guide screen G70 illustrated in FIG. 25, the CPU 302 can display the information related to the alternative flight matching the preferable conditions in the alternative flight display area G72. In addition, the CPU 302 can display the information related to the accommodation indicated in the accommodation information in the accommodation display area G76.

Note that instead of executing steps S430 to S434, the signage terminal 30 itself may acquire the alternative information that matches the preferable conditions. In this case, the CPU 302 of the signage terminal 30 can narrow down the alternative information included in the action guide information for cancellation received from the management server 10 according to the preferable conditions, and acquire the alternative information that matches the preferable conditions.

In addition, in the information processing system 1, biometric information such as the face information registered about the user U in the check-in procedure for the canceled flight can continue to be used in the check-in procedure for the alternative flight and other procedures related to the alternative flight. In this case, the CPU 302 of the signage terminal 30 can cause the display 310 to display operation elements such as buttons, check boxes, or the like for the user U to select to continue using the check-in procedure based on the biometric information on the guide screen G70 or the like. For example, the CPU 302 can cause a button G78 to be displayed so as to be able to be input by touch on the guide screen G70 as an operation element for selecting to continue using the check-in procedure with the biometric information. The user U may select to continue to use the biometric information in the check-in procedure and other procedures related to the alternative flight by operating the operation elements. When the operation element is operated by the user U, such as a check box is checked or a button is touched, the biometric information continues to be used in procedures relating to the alternative flight. On the other hand, when the operation element is not operated, the biometric information of the user U is acquired again and registered by capturing the face image of the user U in the check-in procedure of the alternative flight.

Thus, the CPU 302 can cause the display 310 to display the guide screen for on-time, delay or cancellation to the user U based on the action guide information for on-time, delay or cancellation. The CPU 302 can make the printer 312 print all or part of the information displayed on the guide screen and provide the printed material to the user U. In addition, the CPU 302 can cause the display 310 to display a code symbol such as a QR code (registered trademark) or the like that indicates all or part of the matters displayed on the guide screen in a readable manner. The code symbol may indicate the URL of a web page that displays all or part of the matters displayed on the guide screen. The user U can, for example, read the code symbol by the camera 412 of the mobile terminal 40 and make the display 410 of the mobile terminal 40 display all or part of the matters displayed on the guide screen to confirm them. The CPU 302 can also audibly output the matters displayed on the guide screen, which can be audibly output, from an audio output unit such as a speaker (not illustrated) or the like.

When displaying a guide screen for on-time, delayed or cancellation, the CPU 302 can, in the same manner as the first example embodiment, guide the user U with a specific status to a facility such as a lounge where the user U can use as a waiting area.

In addition, when the flight on which the user U is scheduled to board is canceled and the user U is rescheduled to a flight at a later date, the CPU 302 can make the printer 312 print out a ticket such as an accommodation ticket or the like that allows the user U to stay the accommodation and provide the ticket to the user U. Note that the CPU 302 can display a code symbol such as a QR code (registered trademark) or the like, which indicates an electronic ticket that functions as ticket such as an accommodation ticket or the like, on the display 310 in a readable manner. The code symbol may indicate the URL of the web page displaying the electronic ticket. The user U can, for example, read the code symbol by the camera 412 of the mobile terminal 40, display the electronic ticket on the display 410 of the mobile terminal 40, and use the electronic ticket as the ticket.

Furthermore, the user U can set the mobile terminal 40 that the user U uses to be able to communicate with the management server 10 through the network NW by an application program or the like. In this case, the CPU 102 of the management server 10 can transmit the same action guide information as the action guide information transmitted to the signage terminal 30 to the mobile terminal 40 via the network NW. When the mobile terminal 40 receives the action guide information from the management server 10, the CPU 402 of the mobile terminal 40 can make the display 410 display a guide screen for the user U based on the action guide information, as in the case of the signage terminal 30. In this case, the user U can take appropriate actions while checking the guide screen on the mobile terminal 40 as appropriate.

In addition, the user U can register his or her own contact information such as an e-mail address in the DB of the management server 10. In this case, the CPU 102 of the management server 10 can send a guide message such as an e-mail message or the like containing the same contents as the action guide information sent to the signage terminal 30 to the contact information such as the e-mail address of the user U. In this case, the user U can take appropriate actions while checking the guide message on the mobile terminal 40 as appropriate.

Note that the information processing system 1, after providing the information related to the flight on which the user U is scheduled to be boarded to the user U as described above, can provide the information related to the facilities or the services available to the user U in the same manner as the first example embodiment.

On the other hand, as illustrated in FIG. 19, when the CPU 302 receives the inconsistency information from the management server 10 (step S424, NO), for example, the CPU 302 causes the display 310 to display a notification prompting the user U to perform the check-in procedure (step S438). The CPU 302 can cause the display 310 to display a notification including a map indicating a place where the check-in procedure can be performed such as the check-in terminal 20, the check-in counter and the like, as the notification prompting the check-in procedure. In this case, for example, the CPU 302 can cause the display 310 to display a general usage guide related to the airport A, advertisements, and the like for the user U. The CPU 302 can also audibly output the notification, the usage guide, the advertisements, and the like as described, from an audio output unit such as a speaker (not illustrated).

Thus, in the information processing system 1 according to the present example embodiment, the signage terminal 30 guides the actions to be taken by the user U according to the flight status of the flight on which the user U is scheduled to board. This allows the user U to take appropriate actions in response to the flight status of the flight on which the user U is scheduled to board, even if there is a change of delay or cancellation of the flight.

As described above, according to the present example embodiment, even in the event of a change in the flight status of the flight on which the user U is scheduled to board, such as a delay or cancellation, the actions to be taken by the user U can be accurately guided to the user U.

Another Example Embodiment

Figure 26:
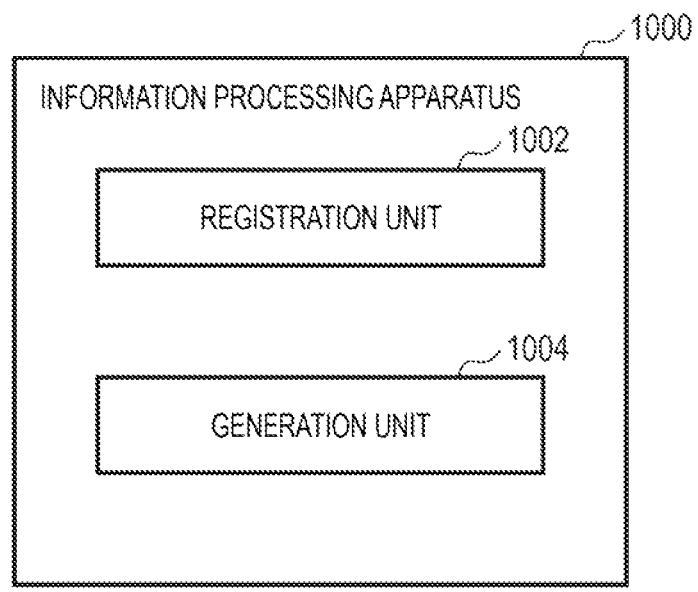
FIG. 26 is a block diagram illustrating the configuration of an information processing apparatus according to another example embodiment of the present invention.

The information processing apparatus described in the above example embodiments may be configured as illustrated in FIG. 26 according to another example embodiment. FIG. 26 is a block diagram illustrating the configuration of an information processing apparatus according to another example embodiment.

As illustrated in FIG. 26, an information processing apparatus 1000 according to another example embodiment includes a registration unit 1002 and a generation unit 1004. The registration unit 1002 registers a status of a user scheduled to board on a transportation related to boarding acquired by a boarding procedure and biometric information of the user acquired during the boarding procedure in association with each other. The generation unit 1004 generates guide information related to a facility or a service available to the user guided by an information processing terminal according to the status of the user. The user is a user identified by matching of target biometric information, which is biometric information acquired by the information processing terminal for one user, and registered biometric information, which is the biometric information registered by the registration unit.

According to another example embodiment, the guide information related to the facility or the service available to the user guided by the information processing terminal is generated according to the status of the user. Therefore, according to another example embodiment, the facility or the service available to the user who is scheduled to board on the transportation can be accurately guided.

Modified Example Embodiment

The present invention is not limited to the example embodiments described above, and various modifications are possible.

For example, in the example embodiments described above, the cases where the biometric information acquisition devices 214, 314 and 512 capture and acquire a face image as the biometric information of the user U are described as examples, but the present invention is not limited to these cases. The biometric information acquisition device 214 of the check-in terminal 20 may acquire not only a face image but also a fingerprint image, an iris image, a finger vein image, a palm print image, a palm vein image, or the like as the biometric information to be registered as the registered biometric information in the user DB 106*a*. In addition, the biometric information acquisition device 314 of the signage terminal 30 may acquire not only a face image but also a fingerprint image, an iris image, a finger vein image, a palm print image, a palm vein image, or the like, according to the registered biometric information as the target biometric information. In addition, the biometric information acquisition device 512 of the facility terminal 50 may acquire not only a face image but also a fingerprint image, an iris image, a finger vein image, a palm print image, a palm vein image, or the like, according to the registered biometric information as the target biometric information. The biometric information does not have to be an image of a living body, but can be a feature amount extracted from an image of a living body.

The management server 10 according to the example embodiment described above may be configured as a system consisting of one or more apparatuses. The check-in terminal 20 according to the example embodiments described above may be configured as a system consisting of one or more apparatuses. The signage terminal 30 according to the example embodiments described above may be configured as a system consisting of one or more apparatuses. The facility terminal 50 according to the example embodiments described above may be configured as a system consisting of one or more apparatuses.

Further, the scope of the example embodiments also includes a processing method that stores, in a storage medium, a program that causes the configuration of each of the example embodiments to operate so as to implement the function of each of the example embodiments described above, reads the program stored in the storage medium as a code, and executes the program in a computer. That is, the scope of each of the example embodiments also includes a computer readable storage medium. Further, each of the example embodiments includes not only the storage medium in which the computer program described above is stored but also the computer program itself.

As the storage medium, for example, a floppy (registered trademark) disk, a hard disk, an optical disk, a magneto-optical disk, a Compact Disc-Read Only Memory (CD-ROM), a magnetic tape, a nonvolatile memory card, or a ROM can be used. Further, the scope of each of the example embodiments includes an example that operates on Operating System (OS) to perform a process in cooperation with another software or a function of an add-in board without being limited to an example that performs a process by an individual program stored in the storage medium.

The whole or part of the example embodiments disclosed above can be described as, but not limited to, the following supplementary notes.

Supplementary Note 1

An information processing apparatus comprising:
a registration unit that registers a status of a user scheduled to board on a transportation related to boarding acquired by a boarding procedure and biometric information of the user acquired during the boarding procedure in association with each other; and
a generation unit that generates guide information related to a facility or a service available to the user guided by an information processing terminal according to the status of the user, who is identified by matching of target biometric information which is biometric information acquired by the information processing terminal for one user, and registered biometric information which is the biometric information registered by the registration unit.

Supplementary Note 2

The information processing apparatus according to supplementary note 1, wherein the generation unit generates the guide information according to the status ranked based on boarding record of the user.

Supplementary Note 3

The information processing apparatus according to supplementary note 1 or 2, wherein the generation unit identifies the facility or the service available to the user based on the status.

Supplementary Note 4

The information processing apparatus according to any one of supplementary notes 1 to 3 comprising:
a control unit that transmits the guide information to the information processing terminal and causes the information processing terminal to perform a display according to the guide information.

Supplementary Note 5

The information processing apparatus according to supplementary note 4, wherein the control unit causes the information processing terminal to display a map including a current location of the user and a location of the facility.

Supplementary Note 6

The information processing apparatus according to supplementary note 5, wherein the control unit causes the information processing terminal to display necessary time from the current location of the user to the location of the facility.

Supplementary Note 7

The information processing apparatus according to supplementary note 4, wherein the control unit causes the information processing terminal to display a map including a location of the facility and a location of a boarding location of the user.

Supplementary Note 8

The information processing apparatus according to supplementary note 7, wherein the control unit causes the information processing terminal to display necessary time from the location of the facility to the boarding location of the user.

Supplementary Note 9

The information processing apparatus according to any one of supplementary notes 4 to 8, wherein the control unit causes the information processing terminal to display time or duration at which the user can stay at the facility.

Supplementary Note 10

The information processing apparatus according to any one of supplementary notes 4 to 9, wherein the control unit causes the information processing terminal to display a content of the facility or the service.

Supplementary Note 11

The information processing apparatus according to any one of supplementary notes 1 to 10, wherein the biometric information is face information.

Supplementary Note 12

An information processing method comprising:
registering a status of a user scheduled to board on a transportation related to boarding acquired by a boarding procedure and biometric information of the user acquired during the boarding procedure in association with each other; and
generating guide information related to a facility or a service available to the user guided by an information processing terminal according to the status of the user, who is identified by matching of target biometric information which is biometric information acquired by the information processing terminal for one user, and registered biometric information which is the biometric information registered by the registration unit.

Supplementary note 13

A storage medium storing a program that causes a computer to perform:
registering a status of a user scheduled to board on a transportation related to boarding acquired by a boarding procedure and biometric information of the user acquired during the boarding procedure in association with each other; and
generating guide information related to a facility or a service available to the user guided by an information processing terminal according to the status of the user, who is identified by matching of target biometric information which is biometric information acquired by the information processing terminal for one user, and registered biometric information which is the biometric information registered by the registration unit.

As described above, although the present invention has been described with reference to the example embodiments, the present invention is not limited to the example embodiments described above. Various modifications that may be understood by those skilled in the art can be made to the configuration or details of the present invention within the scope of the present invention.

REFERENCE SIGNS LIST

1 . . . information processing system
10 . . . management server
20 . . . check-in terminal
30 . . . signage terminal
40 . . . mobile terminal
50 . . . facility terminal
NW . . . Network

What is claimed is:
1. An information processing apparatus comprising:
at least one memory configured to store one or more instructions; and
at least one processor configured to execute the one or more instructions to:
register a status of a user scheduled to board on a transportation related to boarding acquired by a boarding procedure and biometric information of the user acquired during the boarding procedure in association with each other;
generate guide information related to a facility available to the user guided by an information processing terminal according to the status of the user, who is identified by matching of target biometric information which is biometric information acquired by the information processing terminal for one user, and registered biometric information which is the biometric information registered; and
based on the guide information, cause an entrance of the facility to open.

2. The information processing apparatus according to claim 1, wherein the at least one processor is further configured to execute the one or more instructions to generate the guide information according to the status ranked based on boarding record of the user.

3. The information processing apparatus according to claim 1, wherein the at least one processor is further configured to execute the one or more instructions to identify B the facility available to the user based on the status.

4. The information processing apparatus according to claim 1, wherein the at least one processor is further configured to execute the one or more instructions to transmit the guide information to the information processing terminal and cause the information processing terminal to perform a display according to the guide information.

5. The information processing apparatus according to claim 4, wherein the at least one processor is further configured to execute the one or more instructions to cause the information processing terminal to display a map including a current location of the user and a location of the facility.

6. The information processing apparatus according to claim 5, wherein the at least one processor is further configured to execute the one or more instructions to cause the information processing terminal to display necessary time from the current location of the user to the location of the facility.

7. The information processing apparatus according to claim 4, wherein the at least one processor is further configured to execute the one or more instructions to cause the information processing terminal to display a map including a location of the facility and a location of a boarding location of the user.

8. The information processing apparatus according to claim 7, wherein the at least one processor is further configured to execute the one or more instructions to cause the information processing terminal to display necessary time from the location of the facility to the boarding location of the user.

9. The information processing apparatus according to claim 1, wherein the at least one processor is further configured to execute the one or more instructions to cause the information processing terminal to display time or duration at which the user can stay at the facility.

10. The information processing apparatus according to claim 1, wherein the at least one processor is further configured to execute the one or more instructions to cause the information processing terminal to display a content of the facility.

11. The information processing apparatus according to claim 1, wherein the biometric information is face information.

12. The information processing apparatus according to claim 1, wherein the status of the user is based on past flight records of the user.

13. The information processing apparatus according to claim 1, wherein the status of the user is a point program status.

14. An information processing method comprising:
registering, by a computing system, a status of a user scheduled to board on a transportation related to boarding acquired by a boarding procedure and biometric information of the user acquired during the boarding procedure in association with each other;
generating, by the computing system, guide information related to a facility available to the user guided by an information processing terminal according to the status of the user, who is identified by matching of target biometric information which is biometric information acquired by the information processing terminal for one user, and registered biometric information which is the biometric information registered; and
based on the guide information, causing, by the computing system, and entrance of the facility to open.

15. A non-transitory computer-readable storage medium storing a program thereon that, upon execution by a computer, causes the computer to perform steps comprising:
registering a status of a user scheduled to board on a transportation related to boarding acquired by a boarding procedure and biometric information of the user acquired during the boarding procedure in association with each other;
generating guide information related to a facility available to the user guided by an information processing terminal according to the status of the user, who is identified by matching of target biometric information which is biometric information acquired by the information processing terminal for one user, and registered biometric information which is the biometric information registered; and
based on the guide information, causing an entrance of the facility to open.

* * * * *